(12) United States Patent
Shirota et al.

(10) Patent No.: US 9,717,024 B2
(45) Date of Patent: Jul. 25, 2017

(54) METHOD AND APPARATUS FOR LTE RADIO ACCESS NETWORK SHARING

(71) Applicant: QUALCOMM Incorporated, San Diego, CA (US)

(72) Inventors: Masakazu Shirota, Yokohama (JP); Xipeng Zhu, Beijing (CN); Arvind Swaminathan, San Jose, CA (US); Jun Wang, Poway, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 14/387,836

(22) PCT Filed: Apr. 4, 2013

(86) PCT No.: PCT/CN2013/073765
§ 371 (c)(1),
(2) Date: Sep. 24, 2014

(87) PCT Pub. No.: WO2013/149595
PCT Pub. Date: Oct. 10, 2013

(65) Prior Publication Data
US 2015/0043534 A1 Feb. 12, 2015

(30) Foreign Application Priority Data

Apr. 5, 2012 (WO) ................ PCT/CN2012/073526
Aug. 27, 2012 (WO) ................ PCT/CN2012/080622

(51) Int. Cl.
*H04W 36/00* (2009.01)
*H04W 84/04* (2009.01)
(52) U.S. Cl.
CPC ..... *H04W 36/0022* (2013.01); *H04W 84/042* (2013.01)

(58) Field of Classification Search
None
See application file for complete search history.

(56) References Cited

U.S. PATENT DOCUMENTS

2010/0144311 A1 6/2010 Pehrson et al.
2011/0195714 A1* 8/2011 Sawinathan ........ H04W 60/005
455/435.1
(Continued)

FOREIGN PATENT DOCUMENTS

CN 1578486 A 2/2005
CN 102036332 A 4/2011
(Continued)

OTHER PUBLICATIONS

International Search Report and Written Opinion—PCT/CN2012/073526—ISA/EPO—Jan. 17, 2013.
(Continued)

*Primary Examiner* — Chi H Pham
*Assistant Examiner* — Shick Hom
(74) *Attorney, Agent, or Firm* — Arent Fox LLP

(57) ABSTRACT

A method, an apparatus, and a computer program product for wireless communication are provided in which user equipment performs a circuit-switched fallback procedure to connect to a CDMA2000 network. The CDMA2000 network may be selected by the UE or by the network. A plurality of PLMN IDs may be maintained, where the IDs relate to a network that includes an LTE RAN. Each PLMN ID may be associated with a CDMA2000 network sharing the LTE RAN. A CDMA2000 network may be selected for circuit-switched fallback of a user equipment operating in the LTE RAN. The user equipment may be configured to perform a circuit-switched fallback procedure on the selected CDMA2000 network. The CDMA2000 network may be selected by a mobility management entity responsive to a PLMN selection procedure. The PLMN selection pro-
(Continued)

cedure may be performed when the UE reports multiple-operator capability.

76 Claims, 25 Drawing Sheets

(56) References Cited

U.S. PATENT DOCUMENTS

| | | | |
|---|---|---|---|
| 2011/0207458 A1* | 8/2011 | Tanaka | H04W 8/12 |
| | | | 455/435.1 |
| 2011/0317659 A1 | 12/2011 | Ramachandran et al. | |
| 2012/0028661 A1* | 2/2012 | Fang | H04W 36/0022 |
| | | | 455/466 |
| 2012/0034910 A1* | 2/2012 | Fang | H04W 28/16 |
| | | | 455/422.1 |
| 2012/0064884 A1 | 3/2012 | Ramachandran et al. | |
| 2012/0115489 A1* | 5/2012 | Shuai | H04W 36/14 |
| | | | 455/438 |
| 2012/0170503 A1 | 7/2012 | Kelley et al. | |
| 2012/0218889 A1 | 8/2012 | Watfa et al. | |
| 2012/0302234 A1 | 11/2012 | Wallis et al. | |

FOREIGN PATENT DOCUMENTS

| | | |
|---|---|---|
| CN | 102037762 A | 4/2011 |
| CN | 102137471 A | 7/2011 |
| CN | 102364976 A | 2/2012 |
| CN | 102511144 A | 6/2012 |
| WO | 2011090339 A2 | 7/2011 |
| WO | 2013144104 A1 | 10/2013 |

OTHER PUBLICATIONS

International Search Report and Written Opinion—PCT/CN2013/073765—ISA/CN—Jul. 11, 2013.
Lucent A., et al., "CDMA Inter-Working in LTE Shared Networks", 3GPP Draft; R2-121695-SIB8-PERPLMN-V1, 3rd Generation Partnership Project (3GPP), Mobile Competence Centre; 650, Route Des Lucioles ; F-06921 Sophia-Antipolis Cedex ; France, vol. RAN WG2, No. Jeju, Korea; 20120326-20120330, Mar. 19, 2012 (Mar. 19, 2012), XP050606047, [retrieved on Mar. 19, 2012].
Supplementary European Search Report—EP13772935—Search Authority—Munich—Jun. 17, 2016.

* cited by examiner

METHOD AND APPARATUS FOR LTE RADIO ACCESS NETWORK SHARING

CROSS-REFERENCE TO RELATED APPLICATIONS

This application claims the benefit of International Application No. PCT/CN2012/073526, entitled "METHOD AND APPARATUS FOR LTE RADIO ACCESS NETWORK SHARING" and filed on Apr. 5, 2012, and International Application No. PCT/CN2012/080622, entitled "A METHOD TO ENABLE LTE RAN SHARING BETWEEN MULTIPLE HRPD OPERATORS" and filed on Aug. 27, 2012, which are both expressly incorporated by reference herein in their entirety.

BACKGROUND

Field

The present disclosure relates generally to communication systems, and more particularly, to methods for transitioning between cells in a wireless communication system. Aspects further relate to enabling multiple high rate packet data (HRPD) operators to share a long term evolution (LTE) radio access network (RAN).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, systems and methods for circuit-switched fallback (CSFB) are described. Network information may be received by a user equipment for a plurality of CDMA2000 networks, while connected to an LTE radio access network (RAN). Such CDMA2000 networks may comprise, e.g., CDMA2000 1x networks and/or HRPD networks. The network information may be received in a system information block (SIB). A CDMA2000 network may be selected for 1xCSFB or HRPD handover (HO). A 1xCSFB or HRPD HO procedure may then be performed on the selected CDMA2000.

The network information may correspond to a default network. The network information may comprise a plurality of public land mobile network (PLMN) identifiers (IDs), each PLMN ID associated with a CDMA2000 sharing the LTE RAN.

In an aspect of the disclosure, a mapping of the plurality of PLMN IDs that maps each PLMN ID to one or more of a system ID (SID) and a network ID (NID) may be maintained. Selecting the CDMA2000 network for CSFB may include selecting one of the plurality of PLMN IDs. CSFB related procedure may comprise sending a radio resource control (RRC) connection request, the RRC request including the selected PLMN ID. CSFB related procedure may comprise sending an RRC connection setup complete message that includes the selected PLMN ID. Performing the CSFB procedure may comprise requesting network parameters for the CDMA2000 network selected for CSFB subsequent to sending the RRC connection setup complete message. Performing the CSFB procedure may comprise sending a plurality of CSFB-related uplink messages, each of the CSFB-related uplink messages including the selected PLMN ID.

In an aspect of the disclosure, network equipment may determine a plurality of PLMN IDs in a network that includes an LTE RAN. Each PLMN ID may be associated with a CDMA2000 network sharing the LTE RAN. A CDMA2000 network may be selected for CSFB of a user equipment (UE) operating in the LTE RAN. The UE may be configured to perform a CSFB procedure on the selected CDMA2000 network. The CDMA2000 network may be selected by a mobility management entity (MME) responsive to a PLMN selection procedure. The PLMN selection procedure may be performed when the UE reports multiple-operator capability.

In an aspect of the disclosure, network information associated with the selected CDMA2000 network is maintained. The information may comprise a measurement configuration based on the selected CDMA2000 network. The CDMA2000 network may be selected for CSFB based on the network information associated with the selected CDMA2000 network. The CDMA2000 network may be selected for CSFB based on one or more of an indication of a PLMN ID provided by the UE, a tracking area corresponding to the UE, a visiting network policy and a home operator policy associated with the UE. The home operator policy may be maintained by the MME. The network information associated with the selected 1x network may be provided by the MME to the UE in an information element (IE). The network information associated with the selected 1x network may be provided to the UE in CDMA2000 parameters.

In an aspect of the disclosure, configuring the UE comprises broadcasting the network information associated with the selected CDMA2000 network in a system information block. Configuring the UE may comprise broadcasting one or more of the plurality of PLMN IDs in a system information block. A mapping of PLMN IDs may be maintained that associates each of the plurality of PLMN IDs to one or more of a SID and a NID. The mapping of the PLMN IDs may be synchronized with a corresponding mapping of PLMN IDs maintained by the UE.

In another aspect, a system, method, apparatus, and computer program product for wireless communication are presented. The apparatus, receives a first HRPD subnet identifier associated with a first HRPD operator and a first HRPD subnet. Then, the apparatus distinguishes the first HRPD subnet identifier from a second HRPD subnet identifier associated with a second HRPD operator sharing a long term evolution (LTE) network with the first HRPD operator. Thereafter, the apparatus determines whether to perform a session transfer operation to the first HRPD subnet based on the distinguished first HRPD subnet identifier.

The identifier may comprise a PLMN identifier, and the session transfer operation to the first HRPD subnet may be performed when the first HRPD subnet identifier is different from an HRPD subnet identifier associated with a current HRPD subnet.

In another aspect, a system, method, apparatus, and computer program product for wireless communication are described. The apparatus transmits a first HRPD subnet identifier associated with a first HRPD operator and a first HRPD subnet, the first HRPD subnet identifier distinguishable from a second HRPD subnet identifier associated with a second HRPD operator sharing a long term evolution (LTE) network with the first HRPD operator. Then, the apparatus receives at least one request to transfer a session to the first HRPD subnet based on the first HRPD subnet identifier. The identifier may comprise a PLMN identifier, and the request may be received when the first HRPD subnet identifier is different from an HRPD subnet identifier associated with a current HRPD subnet.

DETAILED DESCRIPTION

Figure 1:
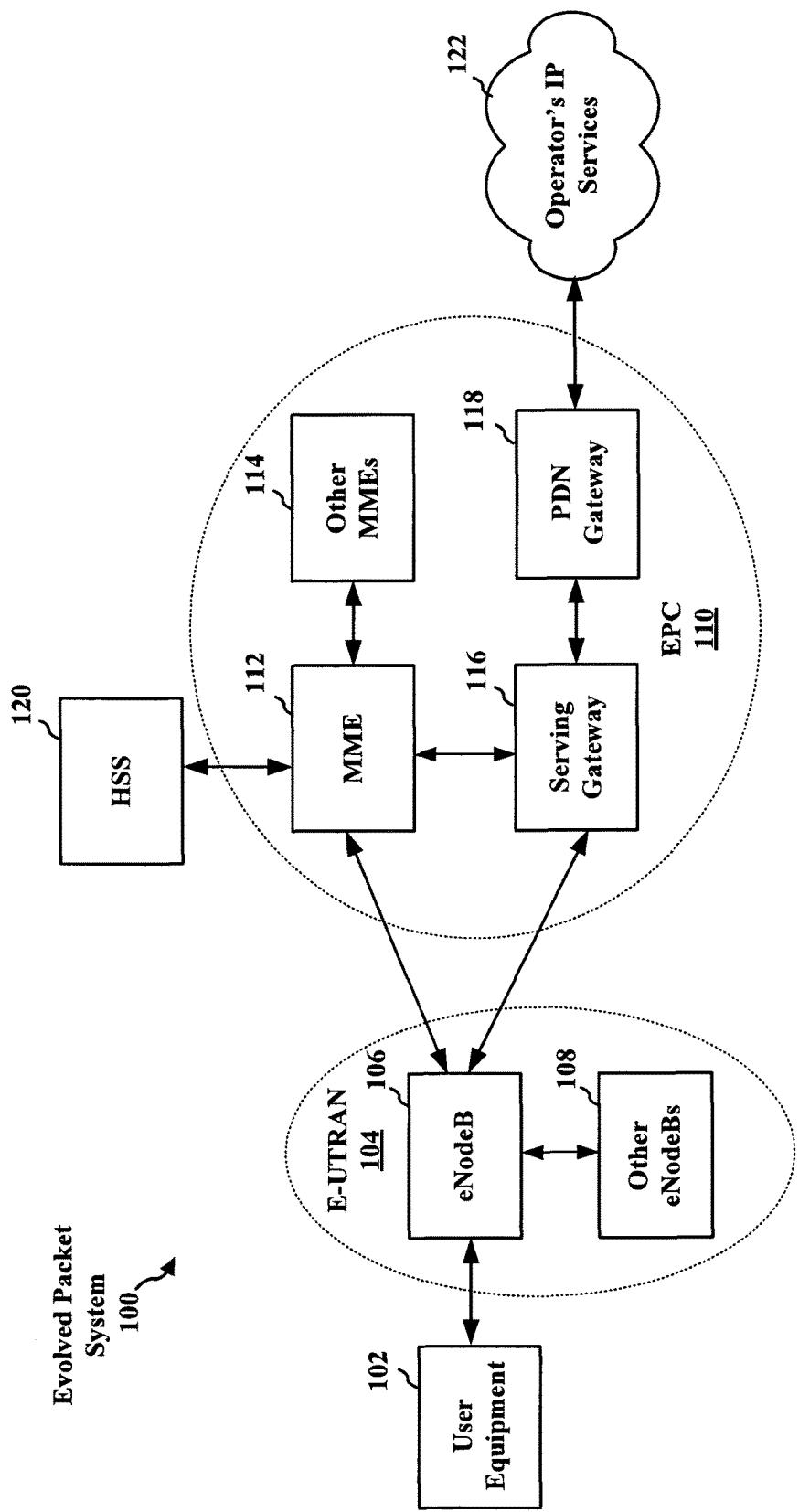
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UE 102, an E-UTRAN 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
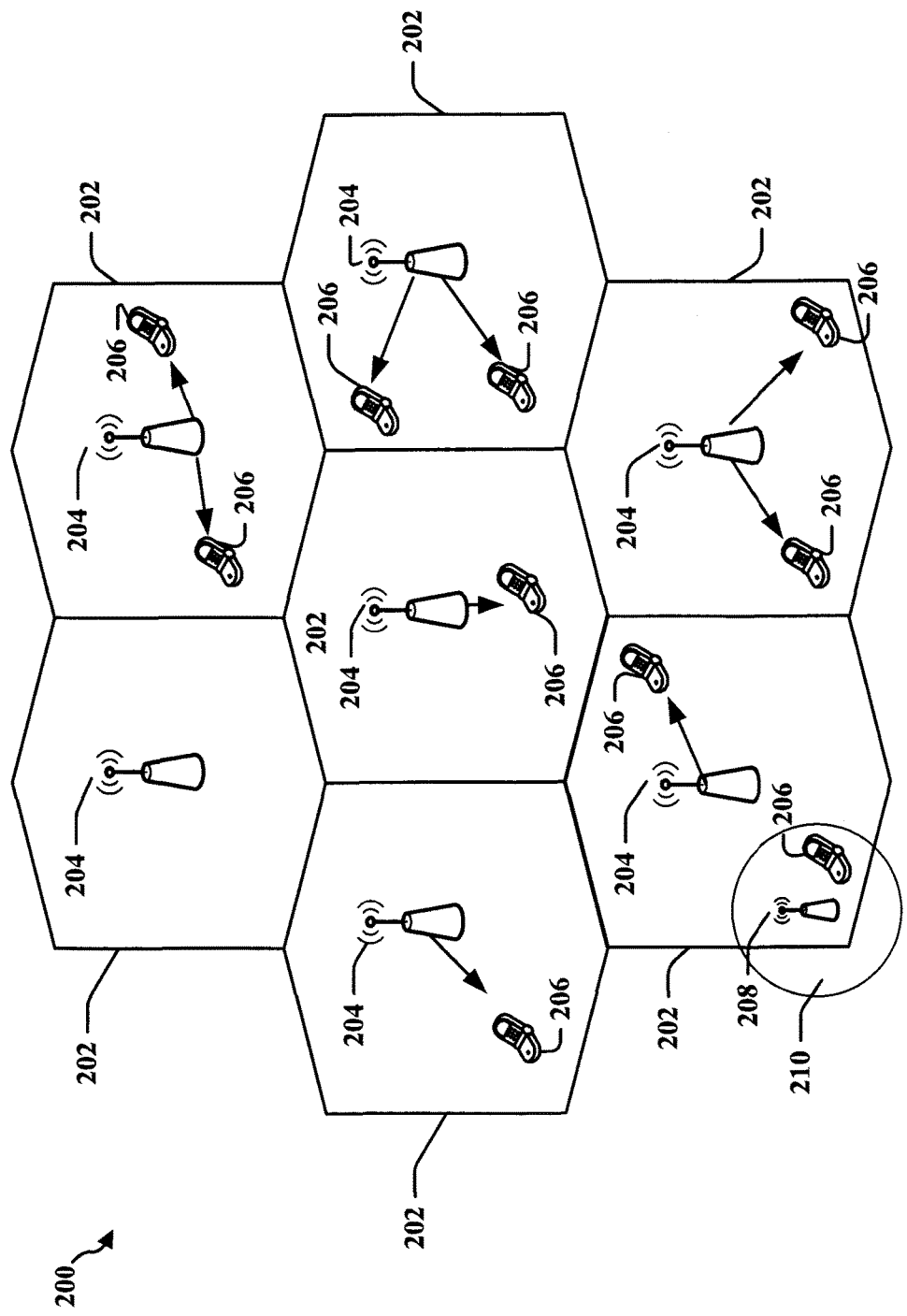
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
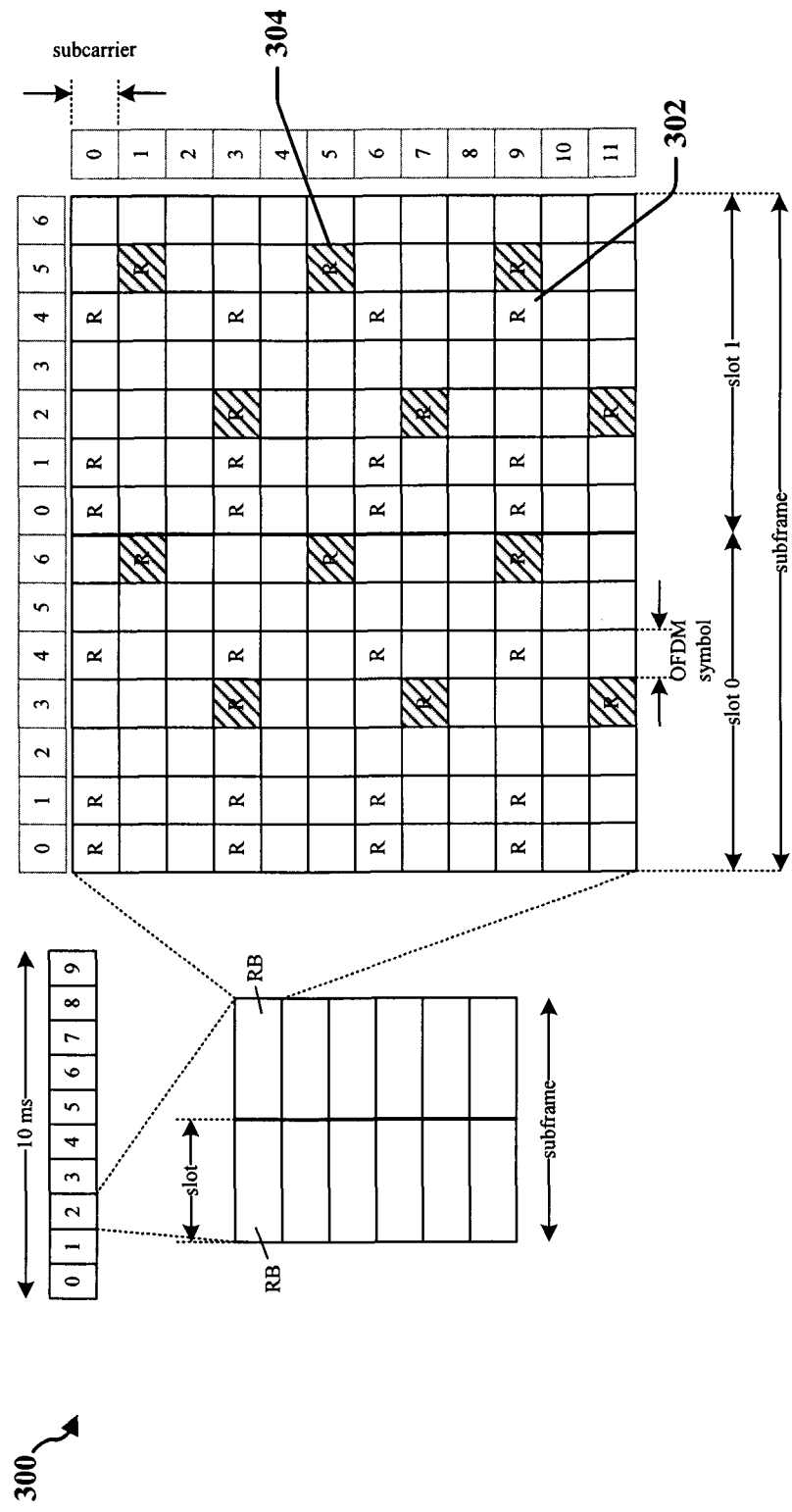
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
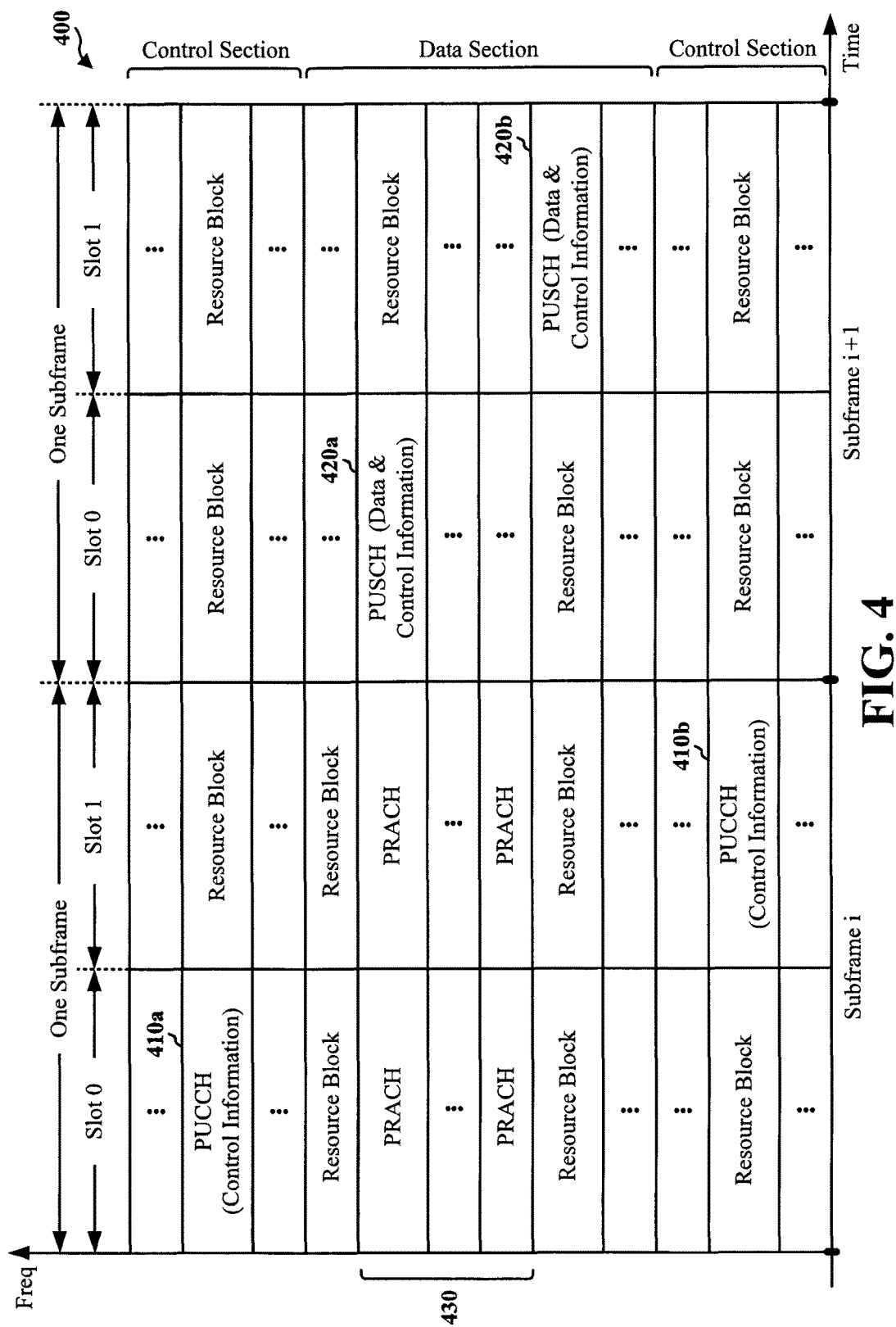
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
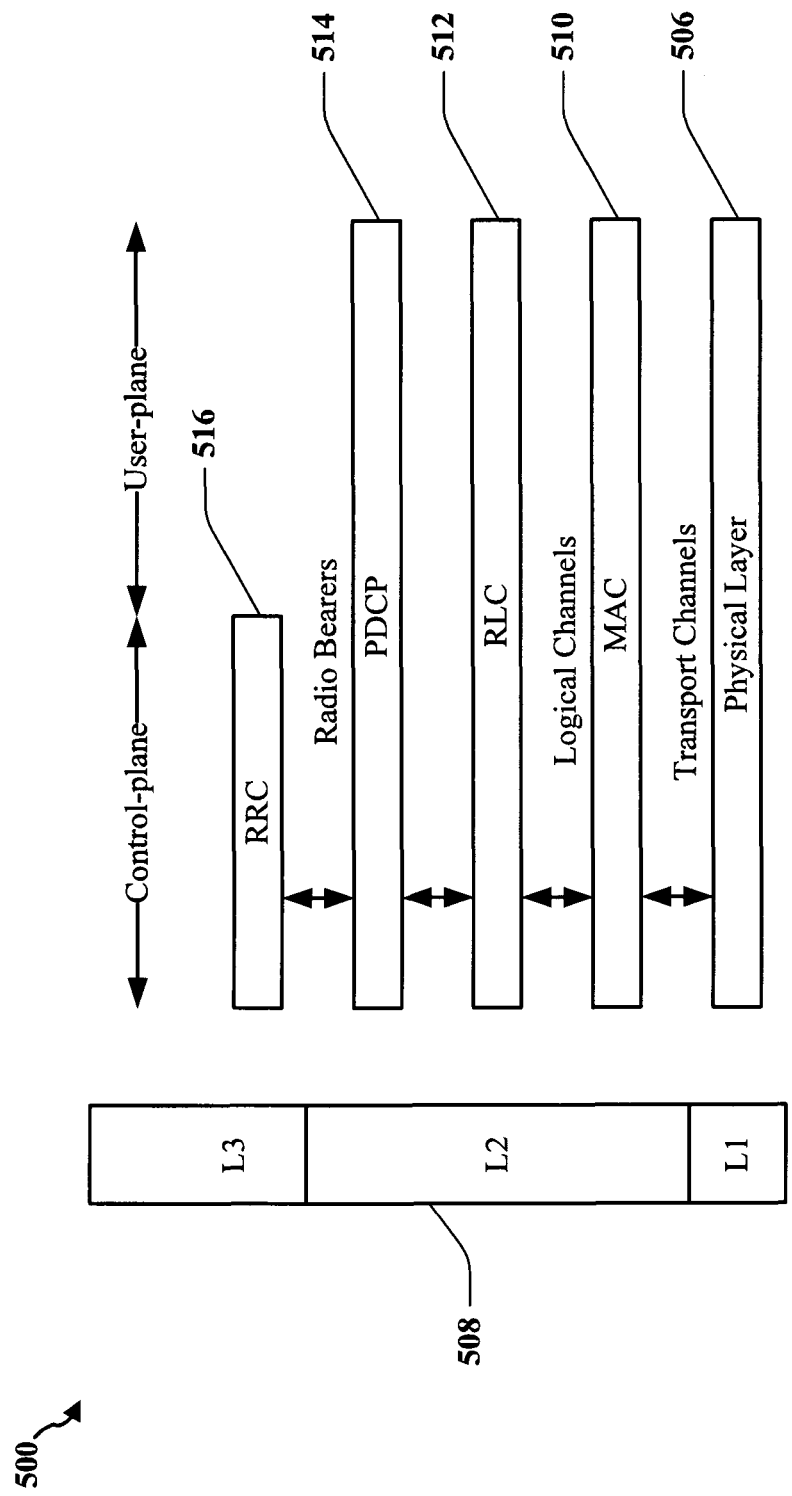
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a RRC sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
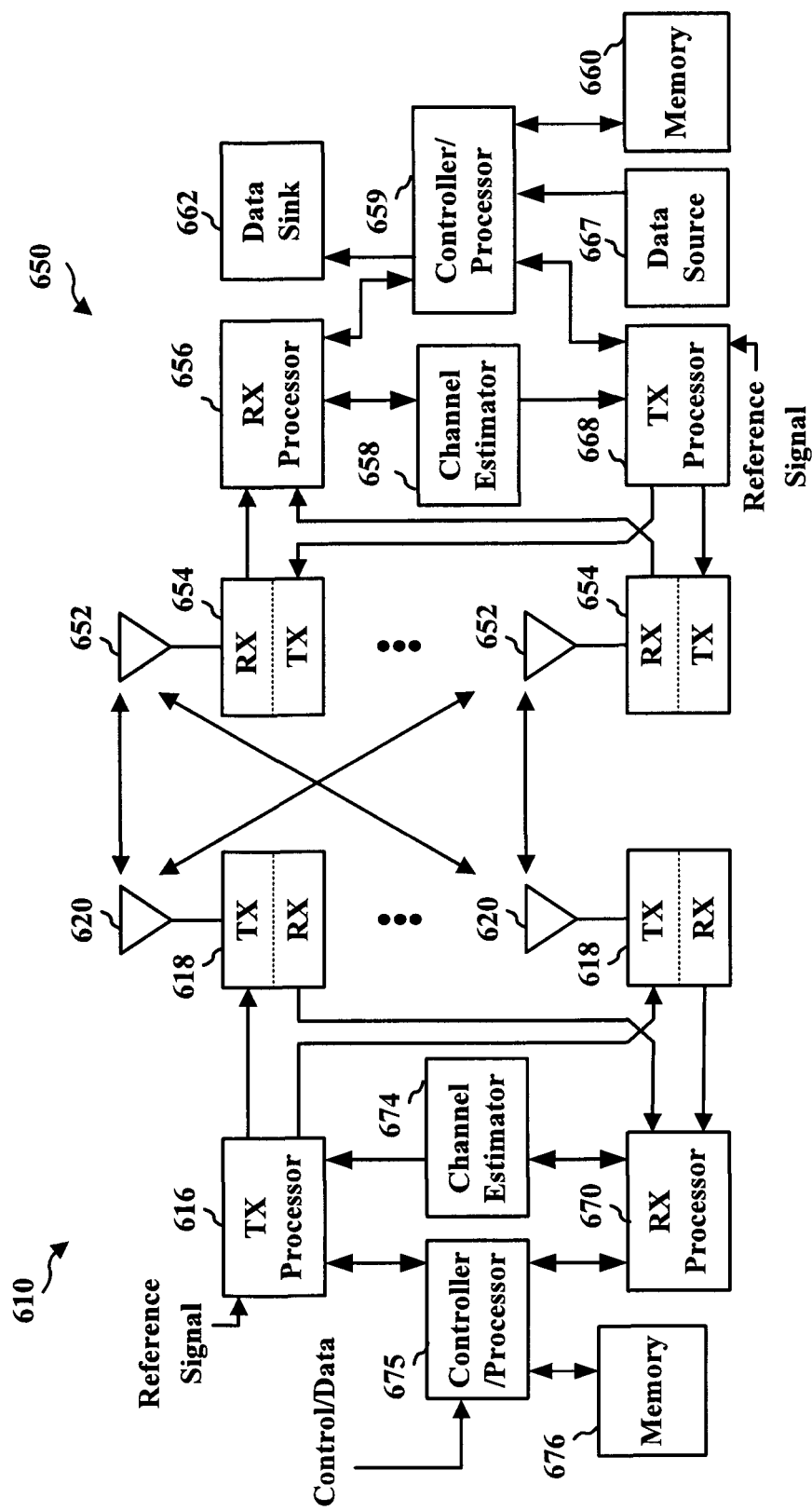
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
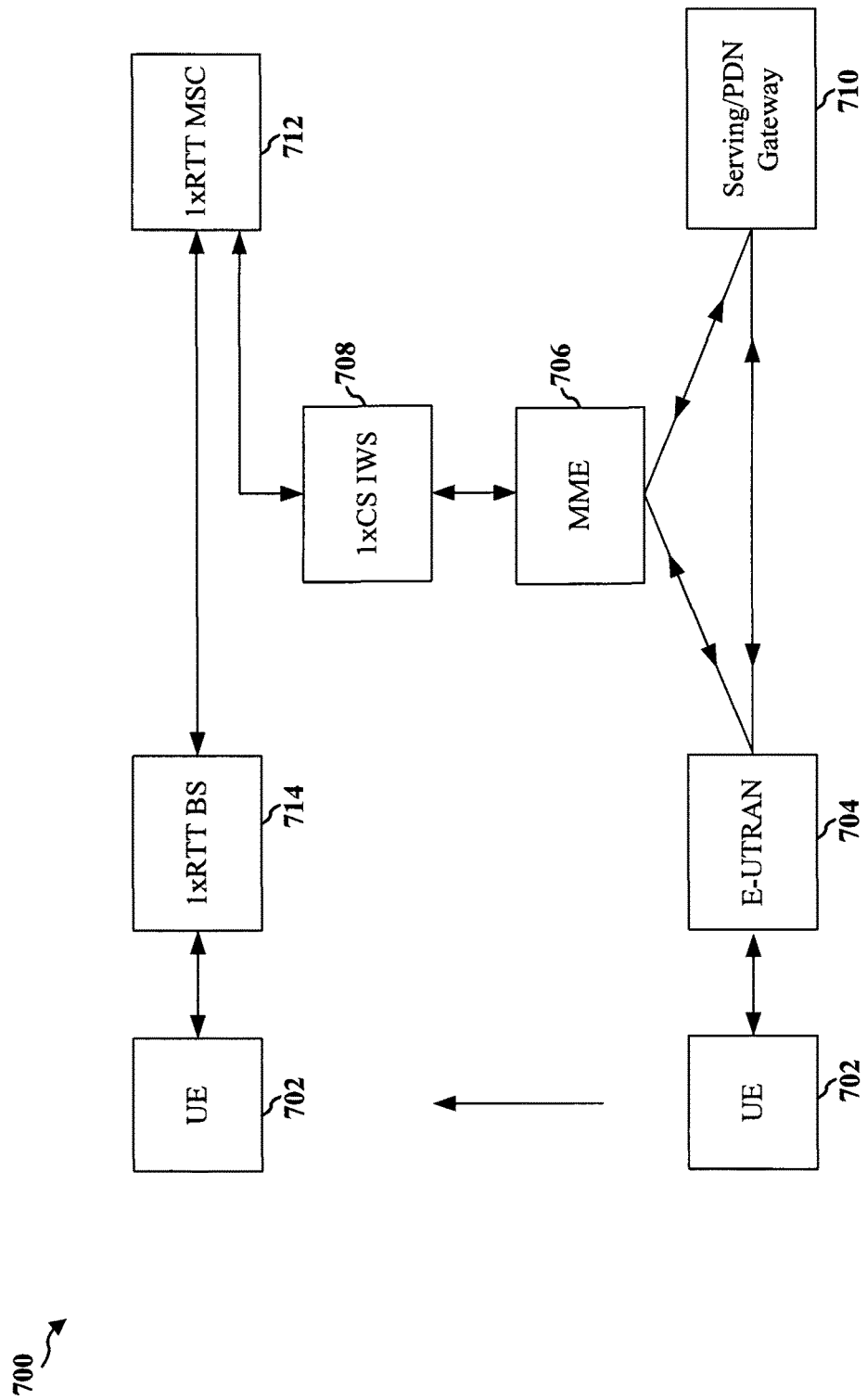
FIG. 7 is a block diagram illustrating inter-radio access technology.

FIG. 7 is a simplified block diagram 700 illustrating 1xCSFB. UE 702 may be initially registered with E-UTRAN 704. A packet data network (PDN) gateway 710 provides connectivity from the UE 702 to external packet data networks. MME 706 serves as a control node and may process signaling between the UE 702 and EPC 110 (see FIG. 1), providing bearer and connection management. IWS 708 may perform a single radio voice call continuity interworking solution function for defined for 3GPP2 1xCS. Mobile switching centre (MSC) 712 may control network switching elements used in the provision of 1xRTT voice services through CS access point 714. UE 702 may be registered with 1xRTT CS 714 as UE 702' in order to obtain voice cervices through a CDMA2000 network, for example.

Figure 8:
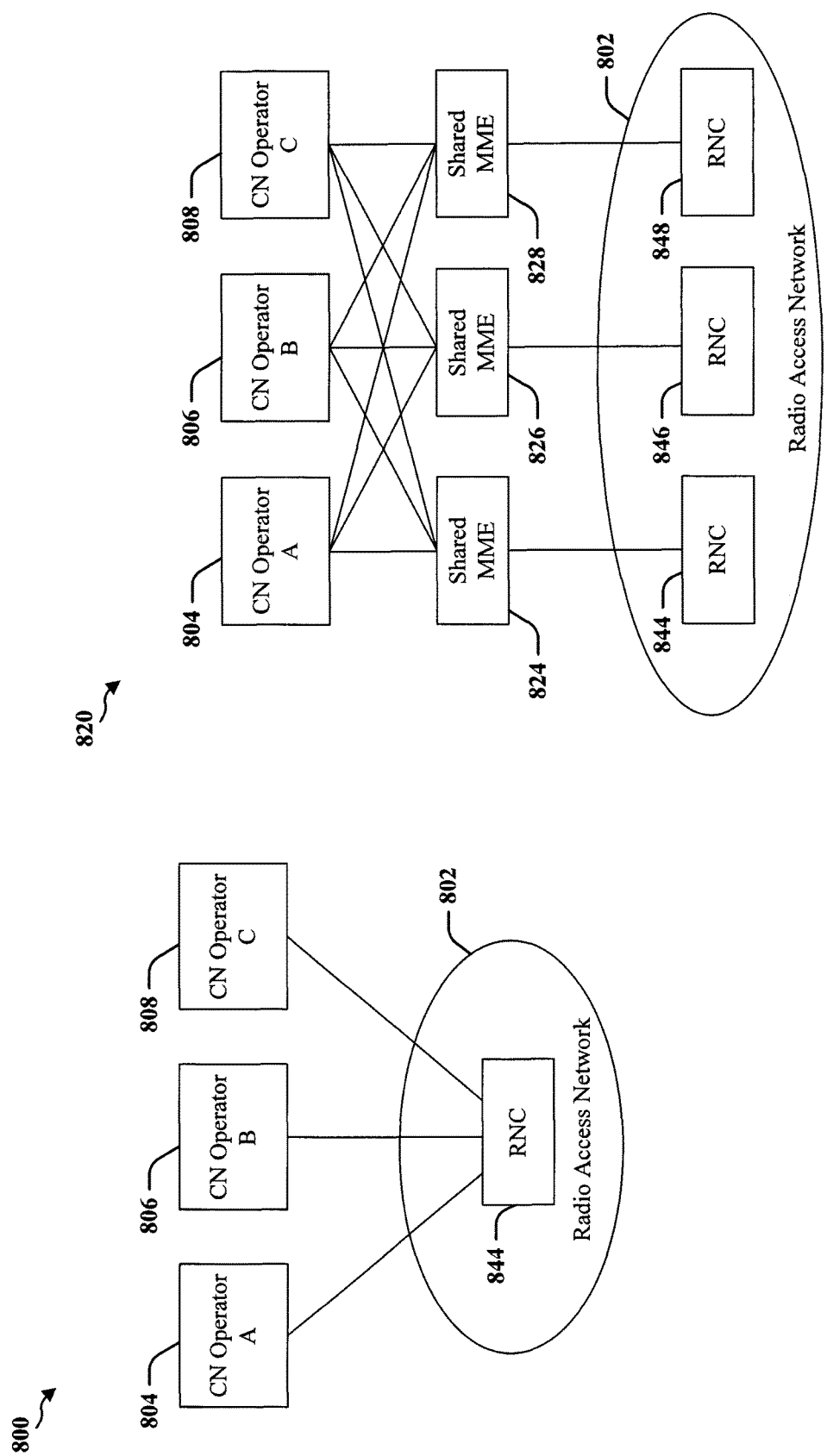
FIG. 8 is a block diagram illustrating UE registration.

FIG. 8 depicts simplified examples 800 and 820 of network sharing. In the multiple operator core network (MOCN) configuration 800, two or more of sharing networks 804, 806, and 808 share (RAN) 802. A RAN 802 may comprise ground-based infrastructure required for delivery of communication between UE 702 and the core network. In LTE, RAN 802 may comprise a radio network controller (RNC) 844 and one or more eNBs 106 (see FIG. 1). In a gateway core network (GWCN) configuration 820, two or more of sharing networks 804, 806, and 808 may share RAN 802, including RNCs 844, 846, and 848, their corresponding eNBs 106, and the EPC network element MME 706. Thus, where a UE 702 is deployed in a GWCN 520 or MOCN 500 and connected to LTE, for example, UE 702 may select one of networks 804, 806, and 808 for handling voice calls.

UE 702 may be deployed in a RAN where multiple accessible cells or networks use different frequencies and/or different radio access technologies (RATs) to access a core network that provides mobility management, session management, transport for Internet Protocol packet services, and other services. RATs may be based on UMTS, TD-SCDMA, GSM, CDMA2000 and WiMAX.

UE 702 may perform a mobility procedure that results in the UE 702 moving from a source cell to a target cell. The mobility procedure may include leaving the source cell to camp on the target cell, identifying characteristics of the target cell, establishing a connection on the target cell, receiving a grant on the target cell, and initiating a location update.

UE 702 may autonomously select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for W-CDMA and may have the lowest priority, and frequency Z may be used for 1xRTT and may have medium priority. In general, the priority list may include any number of frequencies for any set of RATs and may be specific for the UE location. UE 702 may be configured to prefer LTE, when available, by defining the priority list with LTE frequencies at the highest priority and with frequencies for other RATs at lower priorities.

In one example, UE 702 may be able to receive packet-switched (PS) data services from an LTE network and may camp on the LTE network while in the idle mode. UE 702 may attempt to transfer to another wireless network of another RAT. For example, the UE 702 may initiate a circuit-switched (CS) fallback to initiate or receive voice calls. CS fallback may be accomplished by IRAT redirection or handover executed by UE 702. For example, UE 702 may reselect a RAT that supports voice service, such as 1xRTT, W-CDMA, GSM, or other RAT. UE 702 may transfer from an LTE network to another network if LTE service is lost, particularly when UE 702 physically moves through a coverage area of a communication system.

Mobility management (MM) functions may be provided to support UE 702 mobility, including for example non-access stratum (NAS) signaling and security, signaling between core network nodes for mobility between 3GPP access networks, packet data network gateway (P-GW) and serving gateway (S-GW) selection, and SGSN selection for handovers, and roaming and authentication. A UE 702 may have valid MM parameters from both an SGSN 722 and a MME 706, and/or another control node which processes the signaling between the UE 702 and the core network. MME 706 may provide a visitor location register (VLR) for an EPS. For example, a "Temporary Identity used in Next update" (TIN) may be a parameter of an MM context of UE 702, which can identify the identity of the UE 702 used in a next RAU Request, TAU Request or attach request message.

An example of 1x CS fallback (1xCSFB) is described with reference to FIGS. 7 and 8. In the example, UE 702 may be connected to an LTE RAN 802 shared by multiple 3GPP2 operator networks 804, 806, and 808. Networks 804, 806, and 808 may share radio network elements 844, 846, and 848 and radio resources in the LTE RAN 802. 1xCSFB may be supported by two or more of sharing networks 804, 806, and 808 using GWCN 820, whereby the evolved packet core network element MME 706 is shared in addition to the LTE RAN 802. 1xCSFB may be supported by two or more of sharing networks 804, 806, and 808 using MOCN 800, whereby only the LTE RAN 802 is shared.

In the example depicted in FIG. 8, UE 702 may be camped on LTE which includes multiple candidate 1x networks 804, 806, and 808. An optimal 1x network 804, 806, or 808 may be selected for UE 702, which may register (as UE 702') with the selected 1x network for CS services. When 1xCSFB is required, the eNB 804 may direct UE 702 to a base station 714 of the registered 1x network 804, 806, or 808.

Figure 9:
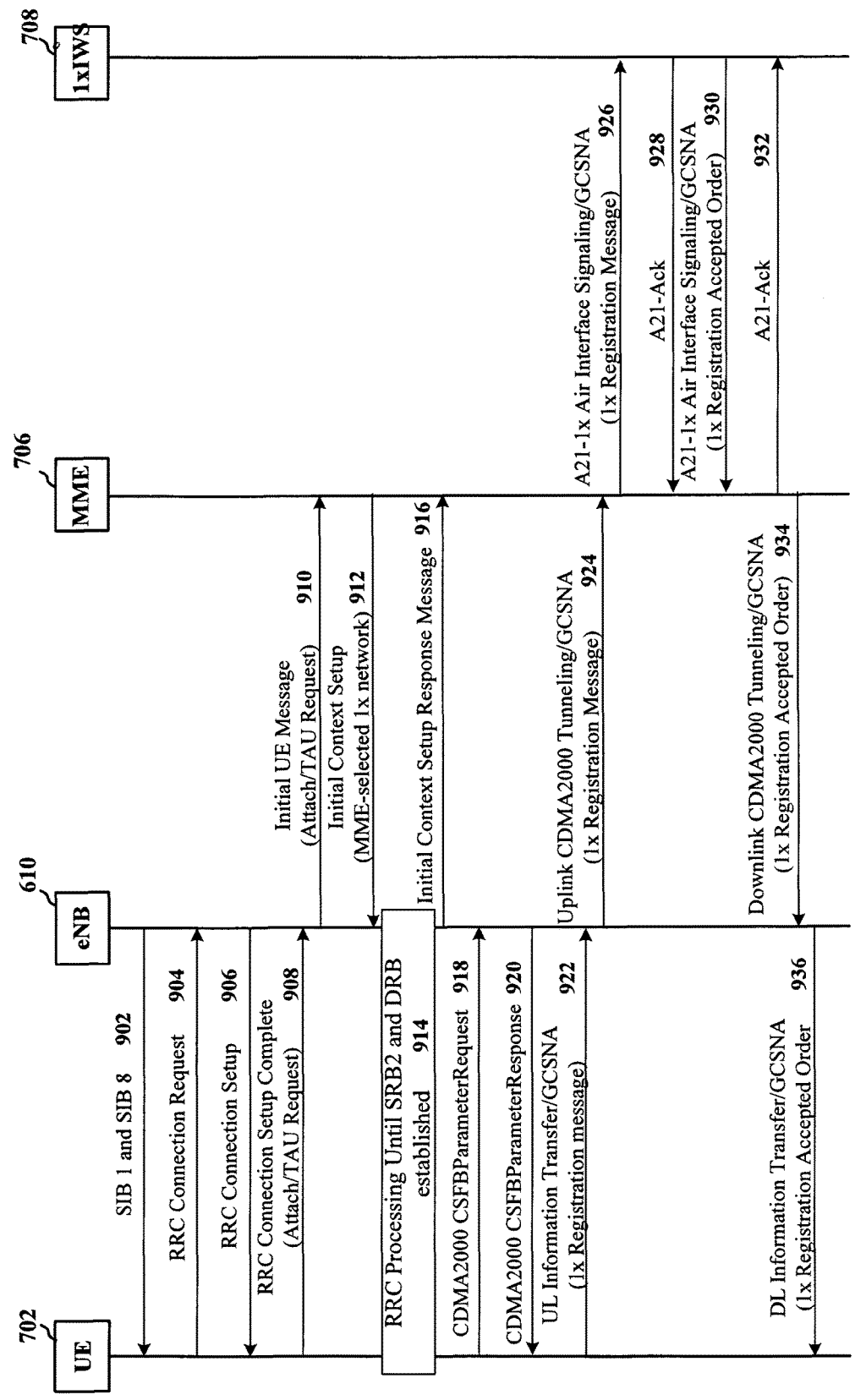
FIG. 9 is a call flow diagram illustrating UE registration.

In some embodiments, the network selects a 1x network 804, 806, or 808 for the UE 702. FIG. 9 is a call flow diagram 900 relating to an example of 1xCSFB in an LTE RAN 802 where eNB 804 directs the UE 702 to register a 1x network 804, 806, or 808 selected by the network. Registration maybe accomplished using IWS 708. UE 702 may receive one or more system information block (SIBs) at 902. The SIBs may comprise a SIB1 that includes multiple PLMN IDs for a plurality of CDMA networks, e.g., CDMA2000 1x networks. The SIB1 may also include, e.g., an LTE operator's PLMN ID along with the PLMNIDs for the CDMA2000 operators. UE may also receive a SIB 8 that includes PLMN indexes and parameters for the CDMA2000 networks. For example, the SIB8 may include 1x parameters for the 1x networks. Thus, the SIB8 may be, e.g., a sequence of {PLMN index, 1xRTT parameters (optional), HRPD parameters (optional)}. UE 702 may select a PLMN ID from the PLMN list provided in SIB1. The UE 702 and network may maintain the mapping between system identification numbers (SIDs) and/or network identification number (NIDs) and the PLMN IDs of the 1x networks.

To establish an RRC connection, the UE 702 may send an RRC connection request at 904 to eNB 804 and, in response at 906, the eNB 804 may send a corresponding RRC connection setup to UE 702. When completed, the UE 702 may send at 908 an RRC connection setup complete to eNB 804. The setup complete message may include the selected PLMN ID, an identification of a registered MME 706, and an attach and/or tracking area update (TAU) request. Based on the PLMN ID selected by UE 702 and the identified registered MME 706, the eNB 804 may select a MME for the 1x network.

AT 910, eNB 804 sends an initial UE message to the selected MME 706. The initial UE message may comprise a selected PLMN ID, an attach request and/or a TAU request. UE 702 capability information elements (IEs) may indicate multiple operator 1xCSFB capability for UE 702.

At 912, MME 706 may proceed with the Attach/TAU procedure to initial context setup. Subscription data fetching and authentication may be performed. If both the UE 702 and network support multiple operator 1xCSFBs, the MME 706 may select a 1x network for the UE 702, taking into consideration one or more of the PLMN ID selected by UE 702, a serving tracking area, a home operator of the UE 702, visiting network policy, load of each 1x network, previous PLMN, and home operator's policy. For a non-roaming UE 702, the home operator 1x network is typically selected as a preference. For a roaming UE 702, the visiting network's policy and home operator's policy may be maintained in one or more MME 706. A domain name server (DNS) may also be used to store subscription data. For example, an international mobile subscriber identity (IMSI), or a part thereof, and a tracking area identity (TAI) may be used as input to DNS or MME 706 local configuration database to query one or more preferred 1x networks for the UE 702.

After a 1x network is selected, MME 706 may store the selected 1x network in a UE 702 context and may send an initial context setup to the eNB 804, with selected 1x network, and an Attach/TAU Accept. The selected 1x network information may be included in the location area identification (LAI) IE of this message.

MME 706 may receive the TAU with a 1x network reselection indicator (e.g. in an additional update type IE) and different selected PLMN ID (in, for example an S1AP Initial UE message) when the selected 1x network has already been stored in the UE 702 context. In this case, the MME 706 typically assumes that the 1x network previously selected is temporally unavailable or that 1x network registration failed. The MME 706 may then select a different 1x network other than 1x network identified in the UE context.

At 914 the UE 702 may proceed with the process of Attach/TAU and establishes signal radio bearer (SRB) SRB2 and data radio bearer (DRB). At step 916 eNB 804 may send the initial context setup response message to MME 706. Meanwhile, at 918, UE 702 may send CSFB parameters request for the CDM2000 network. At 920, eNB 804 returns parameters of the MME-selected 1x network to UE 702. At this step, the UE 702 knows the 1x network to interwork, because MME 706 may have changes the selection of 1x network based on circumstances communicated in message 912.

A UE may then decide to register with 1xRTT and use the SIB8 parameters corresponding to the selected PLMN. UE 702 may then initiate registration at the MME-selected 1x network at 922 by sending an UL information transfer, e.g., a 1x registration message, to eNB 610. At 924, the eNB sends UL CDMA2000 Tunneling, e.g., 1x registration message, CDMA2000 reference cell ID, to MME. The CDMA reference cell ID may be composed, e.g., based on the UE selected PLMN. The MME 706 may then select 1x interworking solution (IWS) 708 for the UE 702. This selection may be based, e.g., on the CDMA2000 reference cell ID. The MME then forwards the 1x registration message to the selected 1xCS-IWF, e.g., via a S102 tunnel. The registration may then be completed using messages 926, 928, 930, 934 and 936.

After the registration is successfully completed (926, 928, 930, 934 and 936), the UE 702 may monitor 1x network parameters in SIB8 with respect to the selected 1x network.

The network selection and pre-registration procedure for HRPD is similar to that illustrated for 1xCSFB in FIG. 9. For HRPD network selection and pre-registration, the UE derives parameters of the HRPD network associated with the selected PLMN ID, e.g., from the SIB8. In pre-registration, the eNB reports the sector ID to MME 706 in order for MME 706 to select an HRPD access node.

Thus, each CDMA 2000 operator is assigned/associated with a unique PLMN ID. The eNB broadcasts each CDMA2000 operator's PLMN in SIB1. SIB 8 is extended to include parameters of multiple CDMA2000 networks. Each CDMA2000 operator's parameters start with the index of the associated PLMN in SIB8. For backward compatibility, SIB8 can be extended in a way that legacy UEs can read a default 1x network in SIB8.

The UE may perform normal PLMN selection, e.g., as per 3GPP TS 23.122. For example, in 3GPP, network selection can be achieved by PLMN selection based on universal subscriber identity module (USIM). The USIM may store, e.g., the UE's home public land mobile network (HPLMN), equivalent home public land mobile network (EHPLMN), operator preferred PLMN list, and UE preferred PLMN list. The PLMN ID corresponding to its home CDMA2000 network may be configured as a HPLMN or an EHPLMN in the USIM. The operator public land mobile network (OPLMN) in the USIM may store the PLMN lists of the home operator preferred CDMA2000 operators for roaming. The network preference information in USIM may be consistent with the network preference information in a preferred roaming list (PRL). CDMA2000 network selection may be based on PRL, the PRL storing home operator preferred CDMA2000 in each place. This preferred roaming CDMA2000 network information may be similar to OPLMN in USIM. With the CDMA2000 network ID to PLMN ID mapping in SIBS, the OPLMN and HPLMN/EHPLMN of USIM can store equivalent information as PRL for network selection. Thus, the USIM can store PLMN preference information which is equivalent to the CDMA2000 network preference information in PRL. With a unique mapping between CDMA2000 operator and PLMN ID, and USIM provisioned with equivalent information to PRL, the PLMN selection procedure can be used to select CDMA2000 network. Thus, USIM based PLMN selection can achieve the same as PRL based CDMA2000 network selection.

FIG. 9 shows the successful registration scenario. In some cases, the registration may be failed. For LTE RAN sharing scenario, it may be better to inform MME about the failure of the registration for 1x network reselection. However, the MME 706 does not typically review the A21 payload. In order to inform MME 706 of 1x registration failure explicitly, an A21 message containing 1x Registration Reject order may have a status code indicating "registration failure." TAU may be used with a different PLMN ID when 1x network registration fails.

In some embodiments, call processing for mobile origination and termination are similar to normal 1xCSFB cases except the MME 706 indicates that the selected 1x network to eNB 804 in S1AP Initial Context Setup or Modify Context Request.

A legacy UE may only understand the parameters of default CDMA2000 operator. Thus, an eNB may handle such legacy UEs differently in e.g. CDMA2000 reference Cell ID selection. There are two options for eNB to know whether UE supports interworking with multiple CDMA2000 operators. First, a new capability bit may be added into UE Radio Capability. Second, 1xCSFB capable R11 UE may be mandated to support interworking with multiple CDMA2000 operators.

Figure 10:
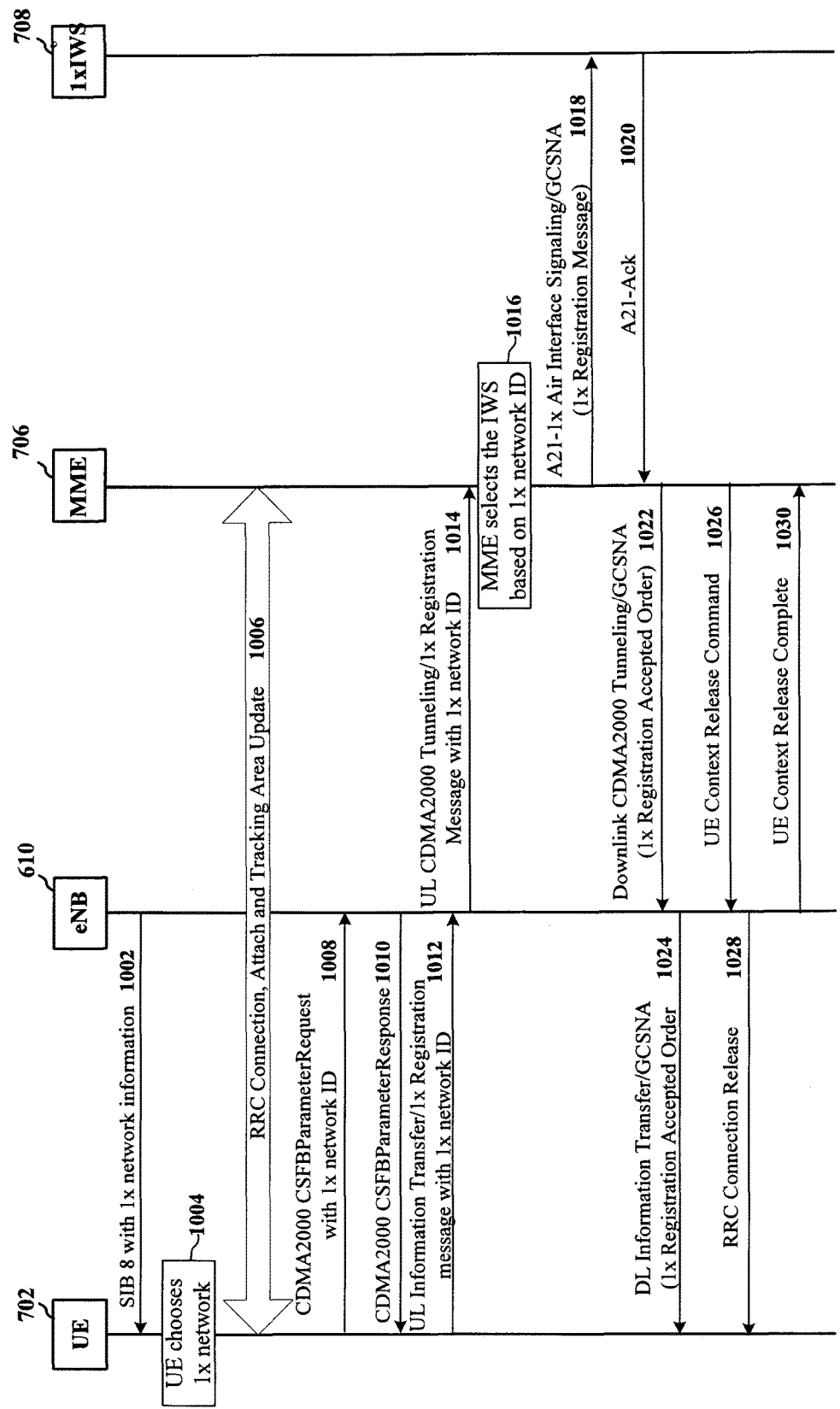
FIG. 10 is a call flow diagram illustrating UE registration.
Figure 11:
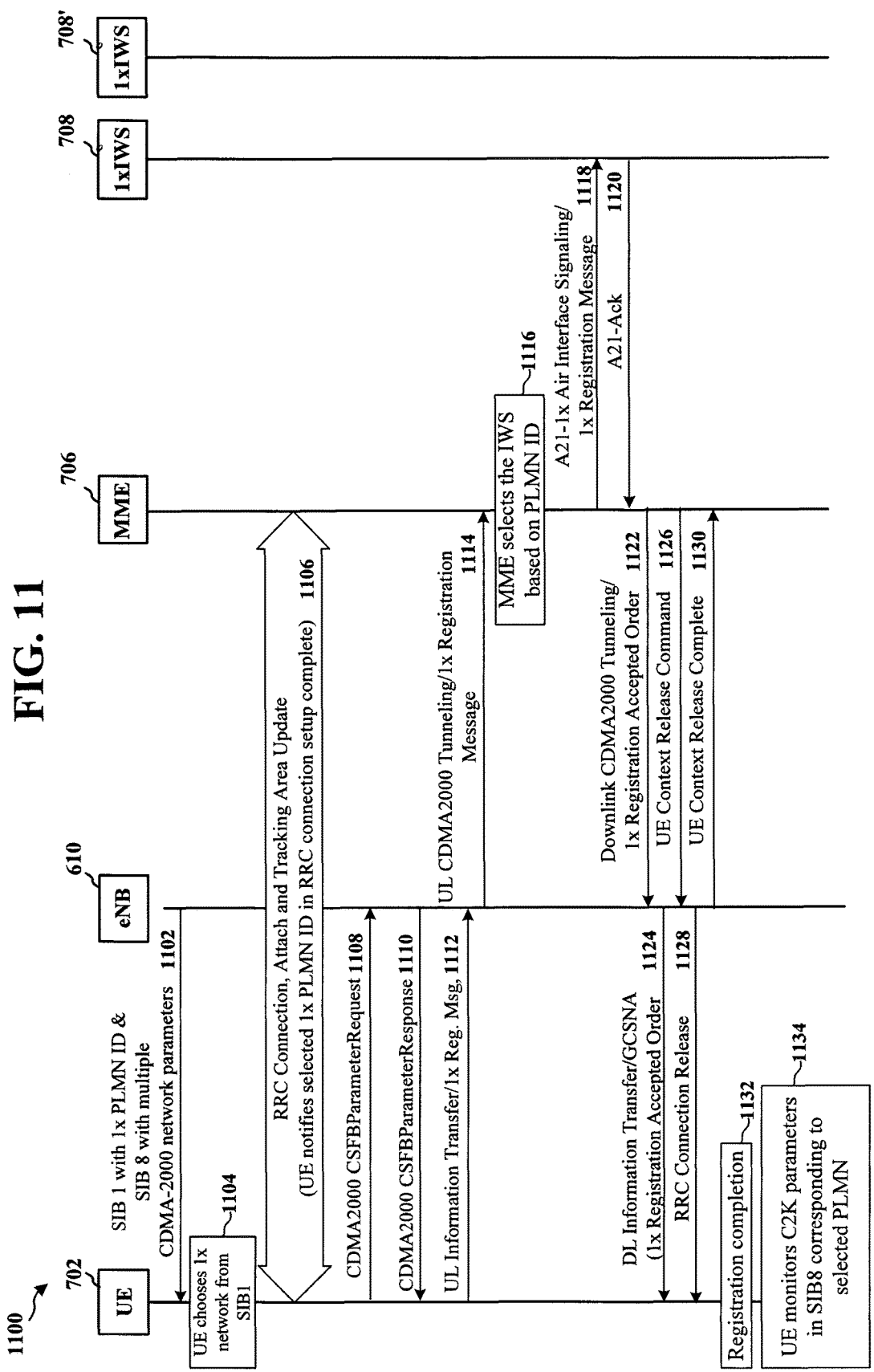
FIG. 11 is a call flow diagram illustrating UE registration.
Figure 12:
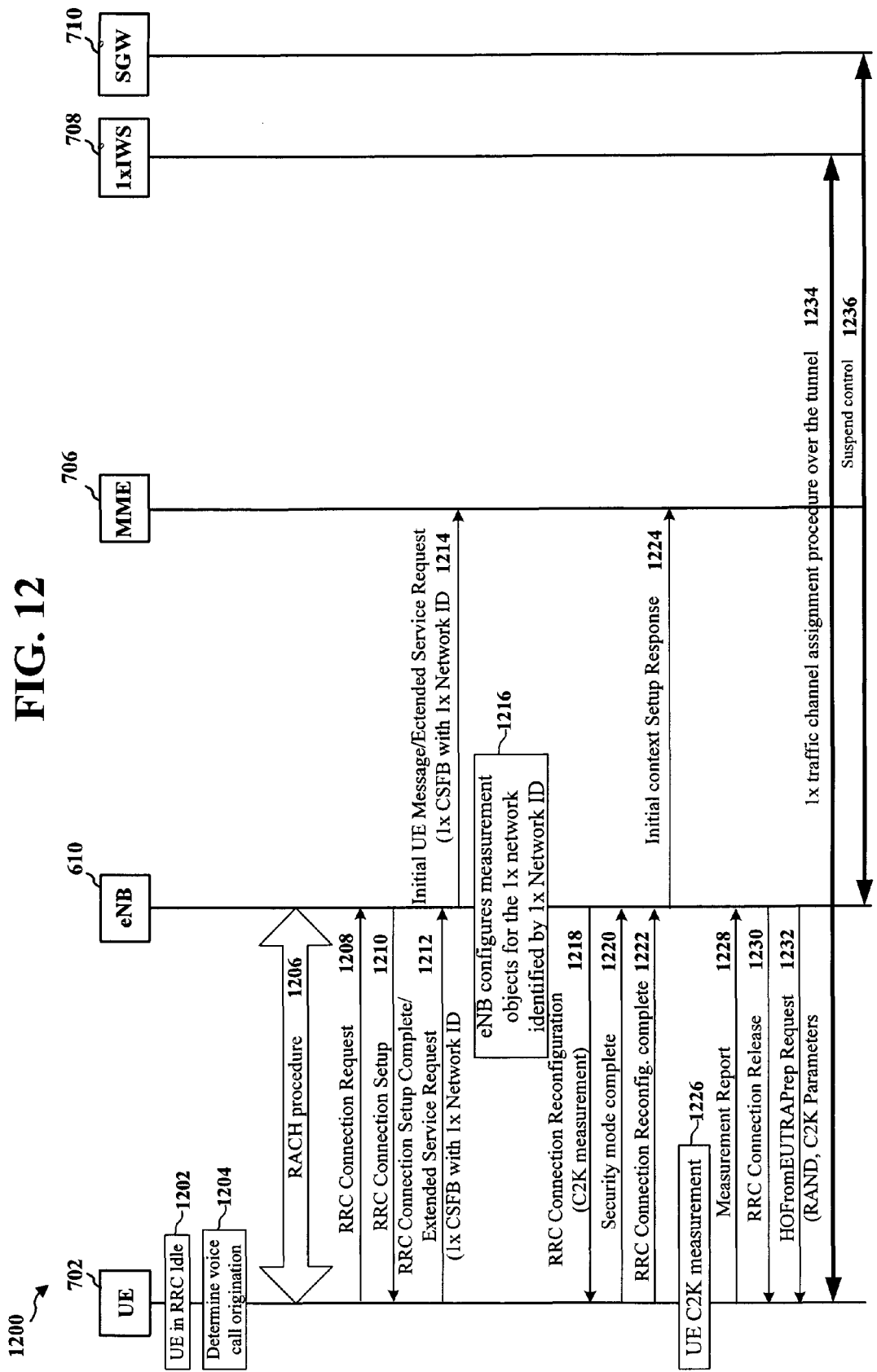
FIG. 12 is a call flow diagram illustrating UE registration.

In certain aspects, the network does not select a 1x network to interwork and the UE 702 may decide which 1x network 804, 806, or 808 should be selected based on the information provided by the network. FIG. 10 is a call flow diagram 1000 relating to an example of a registration process in an LTE RAN 802 where the UE 702 selects the 1x network 804, 806, or 808. In the 1x registration procedure illustrated in FIG. 10 network entities may not store 1x network information as UE 702 context. FIG. 11 is a call flow diagram 1100 relating to an example of registration process in an LTE RAN 802 where the UE 702 selects the 1x network 804, 806, or 808 where the network entities store 1x network information as UE 702 context. FIG. 12 is a call flow diagram 1200 relating to an example of a mobile origination procedure when network entities do not store 1x network information as UE 702 context (see FIG. 10).

In the registration process shown in FIG. 10, SIB 8 provided by eNB 704 at 1002 may include multiple sets of 1x network parameters. SIB8 typically includes 1x network ID for each 1x network. The 1x network ID can be an actual 1x network ID such as a SID/NID pair or new ID which is used only within LTE evolved packet core (LTE/EPC) to identify the 1x network.

At 1004, the UE 702 determines that the attached LTE network supports multiple 1x networks for 1x interworking based on the content of the SIB8 information. The UE 702 may select a 1x network to interwork with from the list of 1x networks provided in the SIB8. The selection may be based on pre-provisioned information in the UE 702, such as a preferred roaming list (PRL).

At 1006, RRC connection setup, Attach and TAU procedures may be performed. In some embodiments, MME 706 is not shared among multiple 1x networks, and a MOCN-like architecture is assumed, whereby it may be necessary to provide 1x network information to the eNB 804. The eNB 804 may select an MME 706 based on 1x network ID in addition to the information normally used.

At 1008, UE 702 may send the CDMA2000-CSFBParameterRequest message to obtain CDMA2000 parameters from the eNB 804. This message may contain the 1x network information necessary to identify the network for interworking to enable the eNB 804 to choose correct CDMA2000 parameters for the 1x network selected for interworking. Accordingly, at 1010, eNB 804 provides the CDMA parameters chosen based on the 1x network ID.

At 1012, UE 702 may send a 1x registration message encapsulated in an UL information transfer with 1x network ID. At 1014, the eNB 804 may send the 1x Registration message encapsulated in the uplink CDMA2000 tunneling message with the 1x network ID to MME 706. The 1x network ID may be obtained from the UL Information Transfer received sent in message 1012.

At 1016, MME 706 selects an IWS 708 based on the selected and indicated 1x network ID. In the example, IWS 708 is selected. The MME 706 may maintain information that maps between 1x network ID and IWS logical address.

At 1018, the MME 706 sends a 1x Registration message in A21-1x air interface signaling to the selected IWS 708. The 1x network ID is typically not required at this point because IWS 708 does not need to know if other operator IWS are present.

In the exchanges 1022, 1024, 1026, and 1028, the 1x network registration accept order is sent from the IWS 708 to UE 702 using the tunnel. It is typically unnecessary to indentify the 1x network being interworked. If the UE 702 needs to send an uplink message which contains a 1x network message, UE 702 may include the 1x network ID to identify the target IWS 708 for interworking.

When the initial registration has been completed, the UE 702 may maintain the 1x network ID for subsequent interworking processes. Typically, the UE 702 needs to monitor only the 1x network parameters in SIB8 related to the network identified by the selected 1x network ID.

Referring now to FIG. 11, a 1x network registration is described in which a UE-based network selection includes maintaining certain 1x network information in the UE context.

Message 1102 comprises SIB1, which may include information related to a plurality of PLMNs associated with 1x networks, and SIB8 which may also include multiple sets of 1x network parameters.

At 1104, UE 702 may have pre-provisioned the matching information between PLMN ID and SID/NID. When SIB1 includes multiple 1x network PLMN IDs, the UE 702 may determine that the LTE network supports multiple 1x networks for 1x interworking. The selection of a 1x network may be made based on the pre-provisioned information in the UE 702, including a preferred roaming list (PRL) for example.

At 1106, RRC connection setup and Attach/TAU procedures may be performed. The UE 702 may send selected PLMN ID for a 1x network in an RRC connection setup complete message. The selected PLMN ID for the 1x network is conveyed to the MME 706 and may be stored in MME 706 as part of UE 702 context. The eNB 804 may also maintain the selected PLMN ID. When MME 706 is not shared among multiple 1x networks, the eNB 804 may select an MME 706 based on the UE-selected PLMN ID in addition to other information used for such selection.

At 1108, UE 702 may send a CDMA2000-CSFBParameterRequest message to eNB 804. In order to choose correct CDMA2000 parameters for the 1x network to interwork, the eNB 804 may also have pre-provisioned information matching PLMN ID and SID/NID.

At 1110, eNB 804 may provide CDMA2000 parameters which contain SID/NID that corresponds to PLMN ID chosen by the UE 702.

At 1112, UE 702 may send the 1x registration message encapsulated in an UL information transfer to eNB 804.

At 1114, eNB 804 may send the 1x registration message encapsulated in an uplink CDMA2000 tunneling message, together with a 1x network ID, to MME 706. MME 706 may select an IWS 708 or 708'—here IWS 708 is selected—based on PLMN ID obtained during step 1106. In certain embodiments, MME 706 does not change PLMN at this point, but follows the selection made by UE 702. Therefore, the MME 706 does not need to obtain or pre-provision preferred 1x network information for UE 702.

At 1118, MME 706 may send the 1x registration message in A21-1x air interface signaling to the selected IWS 708. The 1x network ID is typically not needed because the IWS 708 does not need to know if another operator IWS 708 is present.

In the exchanges 1122, 1124, 1126, and 1128, the 1x registration accept order is sent from the IWS 708 to UE 702 using the tunnel. It is typically unnecessary to identify the 1x network being interworked.

Upon completion of the initial registration, UE 702 may maintain an SID/NID that corresponds to the selected PLMN ID. The UE 702 may monitor only 1x network parameters in SIB8 which include the SID/NID pair that matches the selected SID/NID.

In some embodiments, call processing for mobile origination and termination may be identical to normal 1xCSFB.

Turning now to FIG. 12, a mobile origination procedure based on UE-based network selection is described. At 1202, UE 702 may have registered with one of the 1x networks that share LTE RAN. The UE 702 may maintain the 1x network ID for subsequent signaling.

At 1204, a mobile origination call is triggered, and at 1206, the UE 702 and eNB 804 perform a RACH procedure.

At 1208, UE 702 sends the RRC Connection Request and the eNB 804 may return an RRC connection setup at 1210. The UE 702 may then send an RRC connection setup complete message 1212 with extended service request indicating 1xCSFB and providing a 1x Network ID for interworking. If a MOCN-like architecture is used, RRC message may include a 1x network ID so that eNB 804 can select an appropriate MME 706. In the example depicted, ESR includes the 1x network ID.

At 1214, eNB 804 sends an initial UE 702 message containing extended service request with 1x network ID. The MME 706 sends the initial context setup request message with a 1x network ID. The 1x Network ID is needed for eNB 804 to configure appropriate measurement objects and to select CDMA2000 parameters. The eNB 804 may send the security mode command.

At 1216, eNB 804 configures measurement objects for the 1x network identified by the selected 1x network ID. In some embodiments, redirection based 1xCSFB is always used and measurement objects need not be configured. At 1218, eNB 804 sends the RRC connection reconfiguration with CDMA2000 measurement objects.

At 1220 UE 702 sends the Security Mode Complete and at 1222, the UE 702 sends the RRC connection reconfiguration complete.

At 1224, eNB 804 sends an initial context setup response.

At 1226, the UE 702 performs a 1x network measurement and provides a measurement report at 1228. If redirection is used, the eNB 804 may send, at 1230, an RRC connection release with redirection information.

If HO-based 1xCSFB is used, the HO from EUTRA preparation request is sent at 1232. This message typically includes RAND value and CDMA2000 parameters chosen based on the 1x network ID. Then at 1234, 1x network traffic channel assignment is performed over the tunnel. At 1236, an SGW suspend control is performed. For a mobile termination procedure, the network sends the 1x network page message, triggering the ESR procedure. After ESR is triggered, the fundamentals for call set up procedure may be similar to mobile origination.

Certain embodiments employ an approach whereby SIB 8 includes wildcard CDMA2000 parameters. SIB8 may not provide parameters for each 1x network and may include parameters for a default network to support a legacy UE 702. Actual CDMA parameters and 1x network identifier may be obtained by sending CDMA2000-CSFBParameterResponse. The selection of 1x network may be performed by the network. The UE 702 may trigger 1x network registration when wildcard CDMA2000 parameters are changed.

Figure 13:
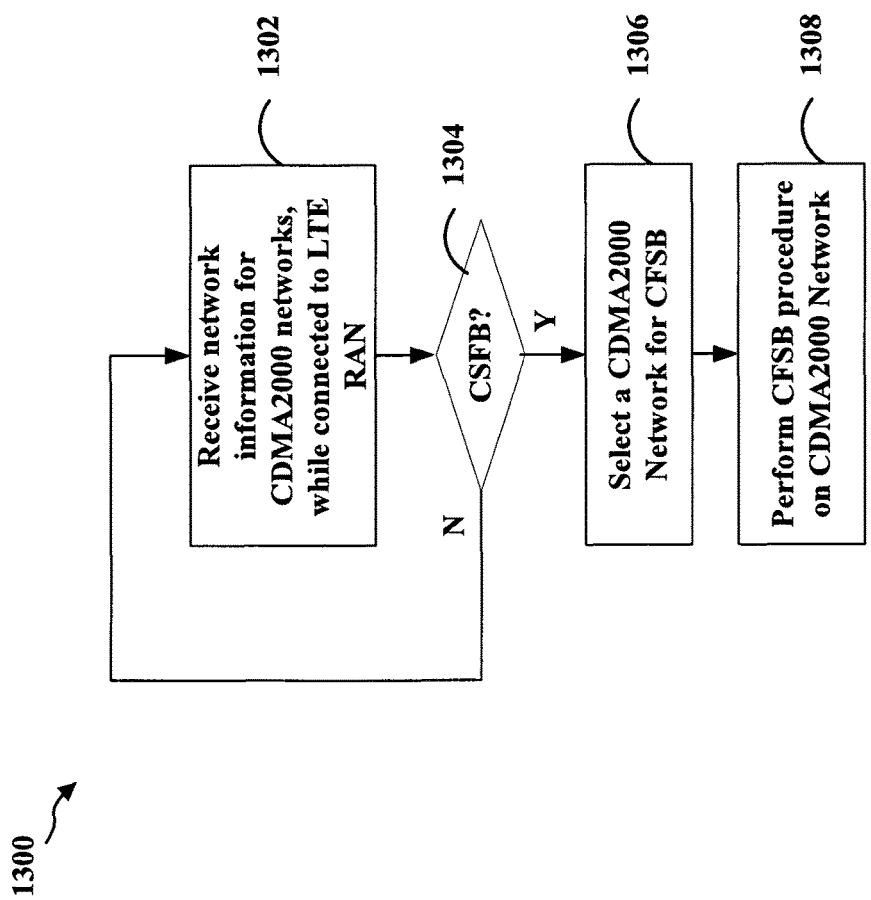
FIG. 13 is a flow chart of a method of wireless communication.

FIG. 13 includes a flow chart 1300 of a method of wireless communication. The method may be performed by a UE 702. At step 1302, the UE 702 receives network information for a plurality of CDMA2000 networks, while connected to an LTE RAN. The network information is received in a SIB. The network information may correspond to a default network. In certain embodiments, the network information comprises a plurality of PLMN IDs. Each PLMN ID may be associated with a CDMA2000 network sharing the LTE RAN. The CDMA2000 network may comprise, e.g., a CDMA2000 1x network and/or a HRPD network.

At step 1304, the UE 702 may determine if a CSFB procedure is required.

At step 1306, if the CSFB procedure is to be performed, the UE 702 may identify or select a CDMA2000 network for CSFB. Selecting the CDMA2000 network may include selecting one of the plurality of PLMN IDs.

At step 1308, the UE 702 may perform one or more CSFB procedures on the selected CDMA2000 network. The CSFB procedure may comprise sending an RRC connection message. The RRC message may comprise a request and may include the selected PLMN ID. The CSFB procedure may comprise sending an RRC connection setup complete message that includes the selected PLMN ID. The CSFB procedure may comprise requesting network parameters for the CDMA2000 network selected for CSFB subsequent to sending the RRC connection setup complete message. The CSFB procedure may comprise sending a plurality of CSFB-related uplink messages, each of the CSFB-related uplink messages including the selected PLMN ID.

In certain embodiments, UE 702 may maintain a mapping of the plurality of PLMN IDs. The mapping may map each PLMN ID to one or more of a SID and an NID corresponding to the selected 1x network.

Figure 14:
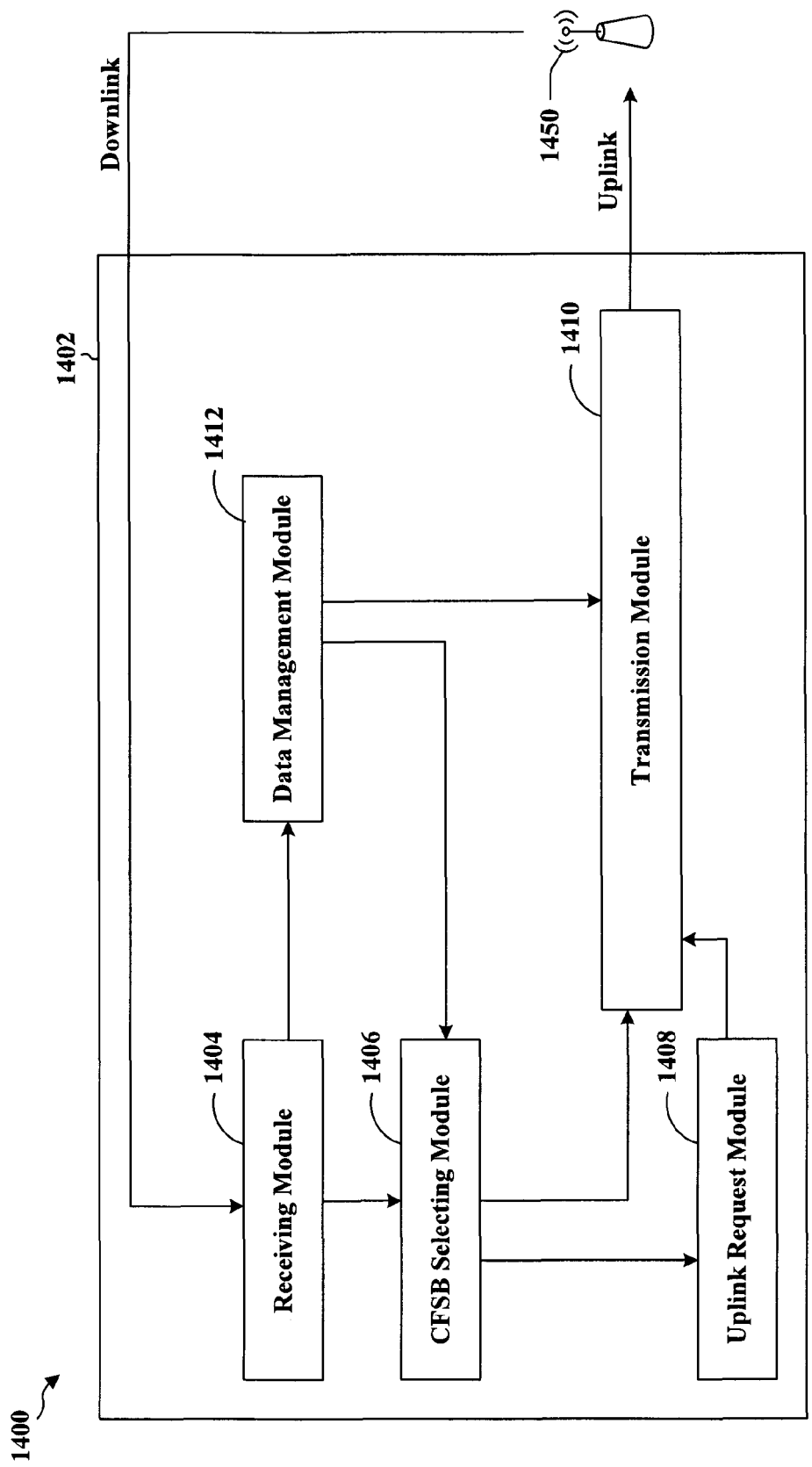
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE 702. The apparatus includes a module 1404 that receives information from an LTE RAN, including network information for a plurality of CDMA2000 networks, the network information being received in an SIB, a module 1406 that selects a CDMA2000 network for CSFB, a module 1408 that generates messages related to uplink requests including messages related to a CSFB procedure performed on the selected CDMA2000 network, a module 1412 that maintains one or more parameters, network information and mappings and a module 1410 that transmits messages to a base station.

The apparatus may include additional modules that perform each of the steps of the algorithm in the aforementioned flow charts of FIG. 13. As such, each step in the aforementioned flow charts of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
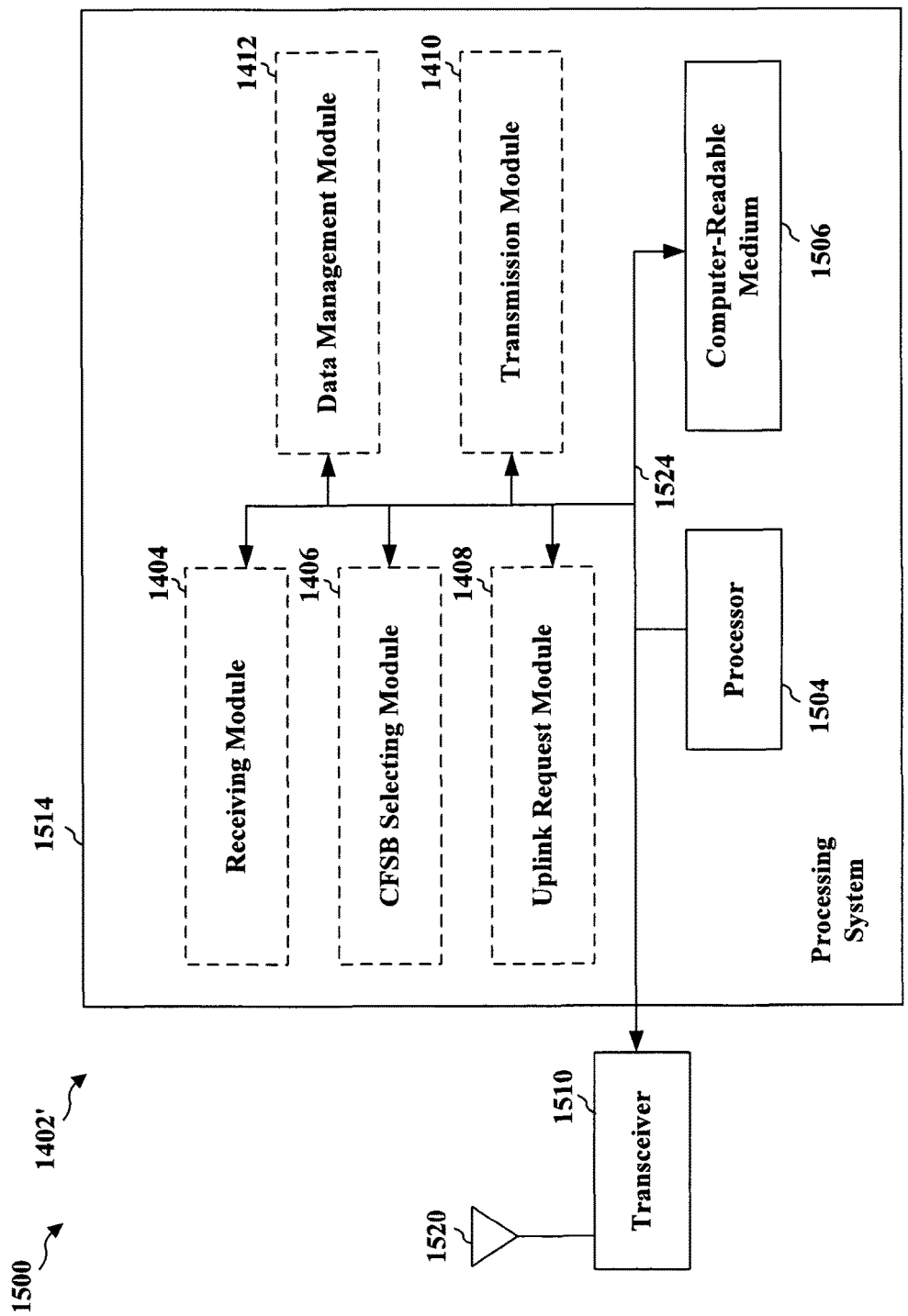
FIG. 15 is a diagram illustrating an example of a hardware implementation for an apparatus employing a processing system.

FIG. 15 is a diagram illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, 1410, and 1412. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means 1404 for receiving information from an LTE RAN, including network information for a plurality of CDMA 2000 1x networks, wherein the network information is received in an SIB, means 1406 for selecting a 1x network for CSFB, means 1408 for generating messages related to uplink requests including messages related to a CSFB procedure performed on the selected 1x network, means 1412 for maintaining one or more parameters, network information and mappings and means 1410 for transmitting messages to a base station.

The means described may perform multiple tasks, some of which may be related to one another. For example, means 1412 may maintain a mapping of a plurality of PLMN IDs that maps each PLMN ID to one or more of an SID and an NID corresponding to a CDMA2000 network. In another example, means 1406 may select one of the plurality of PLMN IDs. In another example, means 1408 may facilitate performance of a CSFB procedure by sending an RRC connection request, the RRC message including a selected PLMN ID, and/or requesting network parameters for the CDMA2000 network selected for CSFB subsequent to sending the RRC connection setup complete message.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 16:
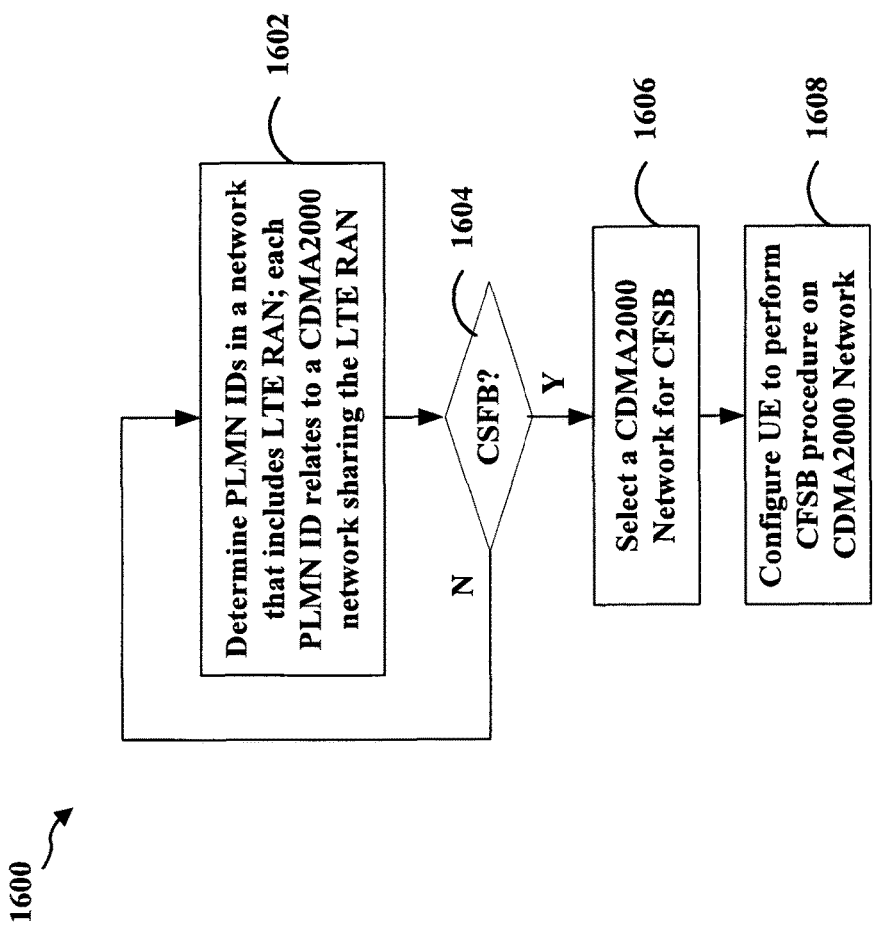
FIG. 16 is a flow chart of a method of wireless communication.

FIG. 16 includes a flow chart 1600 of a method of wireless communication. The method may be performed by an MME 706 and/or an eNB 610 (see FIG. 6). At step 1602, the ENB 610 may determine a plurality of PLMN IDs in a network that includes an LTE RAN. Each PLMN ID may be associated with a CDMA2000 network that shares the LTE RAN. The CDMA2000 network may comprise, e.g., a CDMA2000 1x network and/or a HRPD network.

At step 1604, the eNB 610 may determine that a UE 702 that is operating in the LTE RAN is required to perform CSFB.

At step 1606, when CSFB is required, the ENB 610 may select a CDMA2000 network for CSFB of the UE 702. The CDMA2000 network may be selected by an MME 706. The PLMN may be selected using a PLMN selection procedure. The PLMN selection procedure may be performed when the UE 702 reports multiple-operator capability.

At step 1608, the ENB 610 may configure the UE 702 to perform one or more CSFB procedures on the selected CDMA2000 network. Configuring the UE 7102 may comprise broadcasting network information associated with the selected CDMA2000 network in a system information block. Configuring the UE 702 may comprise broadcasting one or more of the plurality of PLMN IDs in a system information block.

In certain embodiments, one or more of an eNB 610 and an MME 706 maintains network information associated with the selected CDMA2000 network. The information may comprise a measurement configuration based on the selected CDMA2000 network. The 1x network may be selected for CSFB based on the network information associated with the selected CDMA2000 network. The CDMA2000 network may be selected for CSFB based on one or more of an indication of a PLMN ID provided by the UE 702, a tracking area corresponding to the UE, a visiting network policy and a home operator policy associated with the UE 702. The home operator policy may be maintained by the MME 706. The network information associated with the selected CDMA2000 network may be provided by the MME 706 or eNB 610 to the UE 702 in an information element (IE). The network information associated with the selected CDMA2000 network may be provided to the UE 702 in CDMA2000 parameters.

In certain embodiments, the eNB 510 and/or MME 706 may maintain a mapping of PLMN IDs that associates each of the plurality of PLMN IDs to one or more of a SID and an NID. The mapping of the PLMN IDs may be synchronized by the eNB 510 and/or MME 706 with a corresponding mapping of PLMN IDs maintained by the UE.

Figure 17:
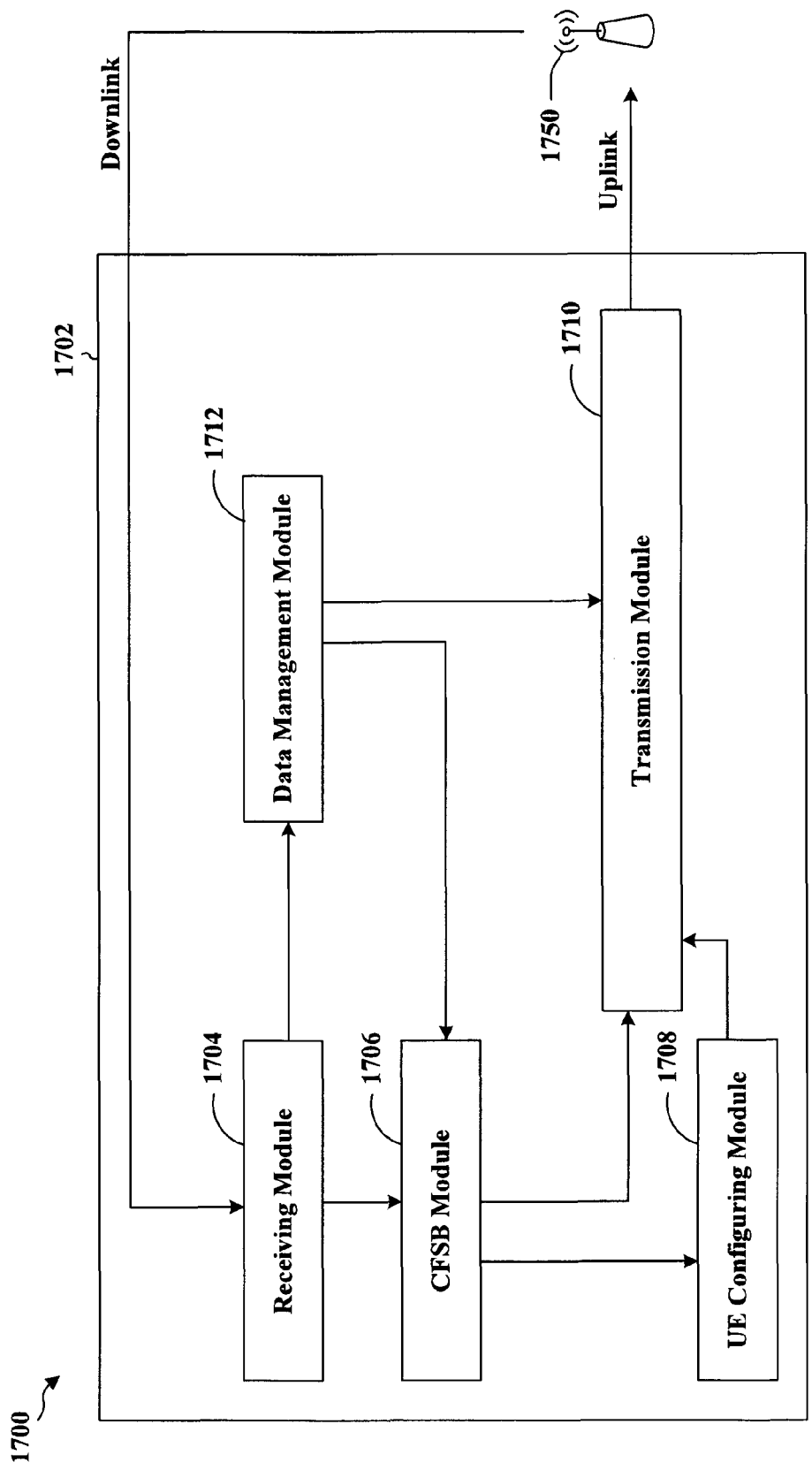
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be an eNB 510 or an MME 706. The apparatus includes a module 1704 that receives information from a UE 702, a module 1706 that selects a CDMA2000 network for CSFB and maintains network information related to the 1x network, a module 1608 that generates and provides configuration for a UE 720 related to a CSFB procedure performed on the selected CDMA2000 network, a module 1712 that maintains one or more parameters, network information and mappings and a module 1710 that transmits messages to a UE 702.

The apparatus may include additional modules that perform each of the steps of the algorithm in the aforementioned flow charts of FIG. 16. As such, each step in the aforementioned flow charts of FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
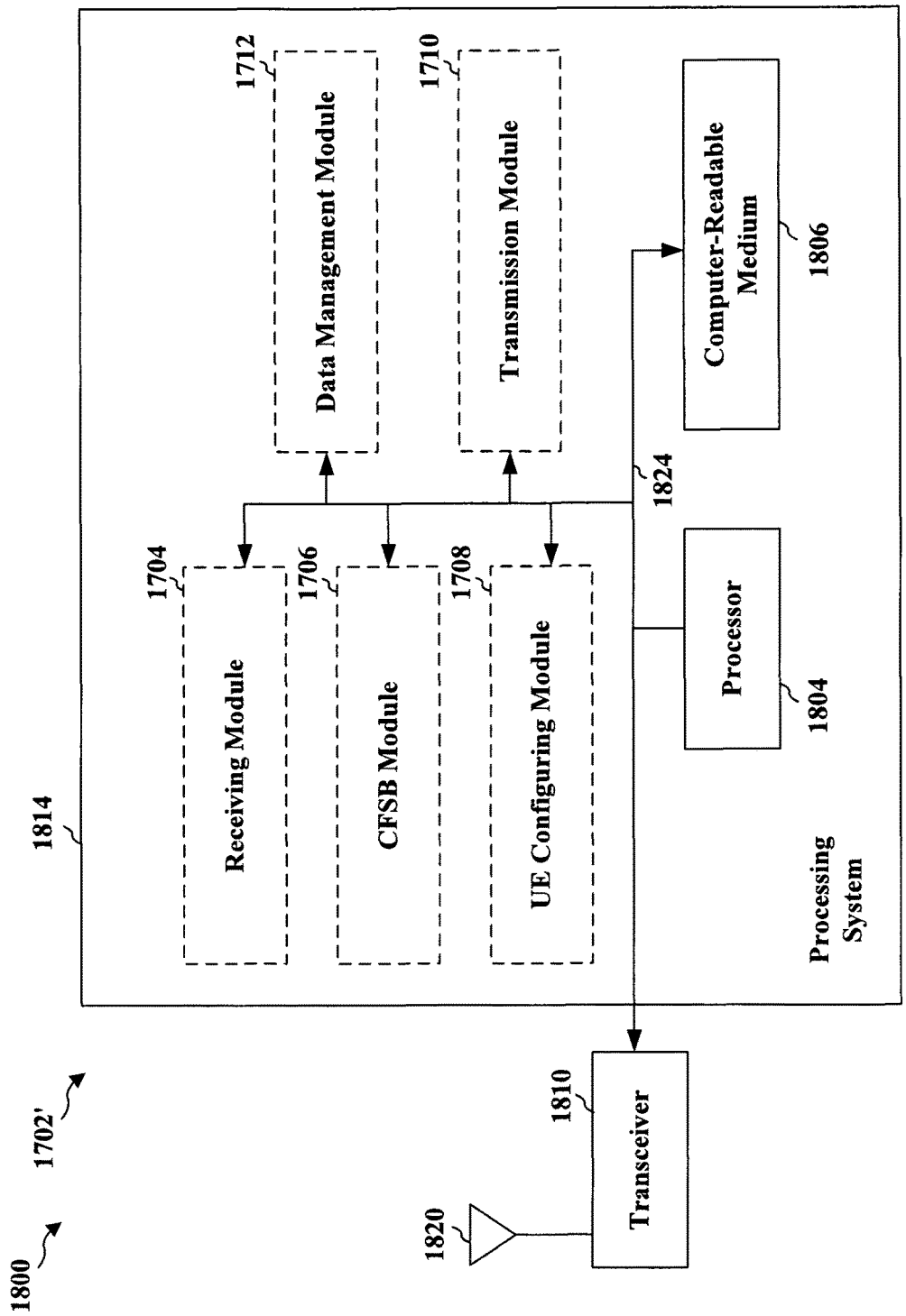
FIG. 18 is a diagram illustrating an example of a hardware implementation for an apparatus employing a processing system.

FIG. 18 is a diagram illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1806, 1708, 1810, 1712, and the computer-readable medium 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes at least one of the modules 1704, 1706, 1708, 1710, and 1712. The modules may be software modules running in the processor 1804, resident/stored in the computer readable medium 1806, one or more hardware modules coupled to the processor 1804, or some combination thereof. The processing system 1814 may be a component of the eNB 610 or MME 706 and may include the memory 676 and/or at least one of the TX processor 616, the RX processor 670, and the controller/processor 675.

In one configuration, the apparatus 1702/1702' for wireless communication includes means 1704 for receiving information from a UE 702, means 1706 for selecting a CDMA2000 network for CSFB and maintaining network information related to the CDMA2000 network, means 1708 for generating and providing configuration for a UE 720 related to a CSFB procedure performed on the selected CDMA2000 network, means 1712 for maintaining one or more parameters, network information and mappings and means 1710 for transmitting messages to a UE 702.

The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 19:
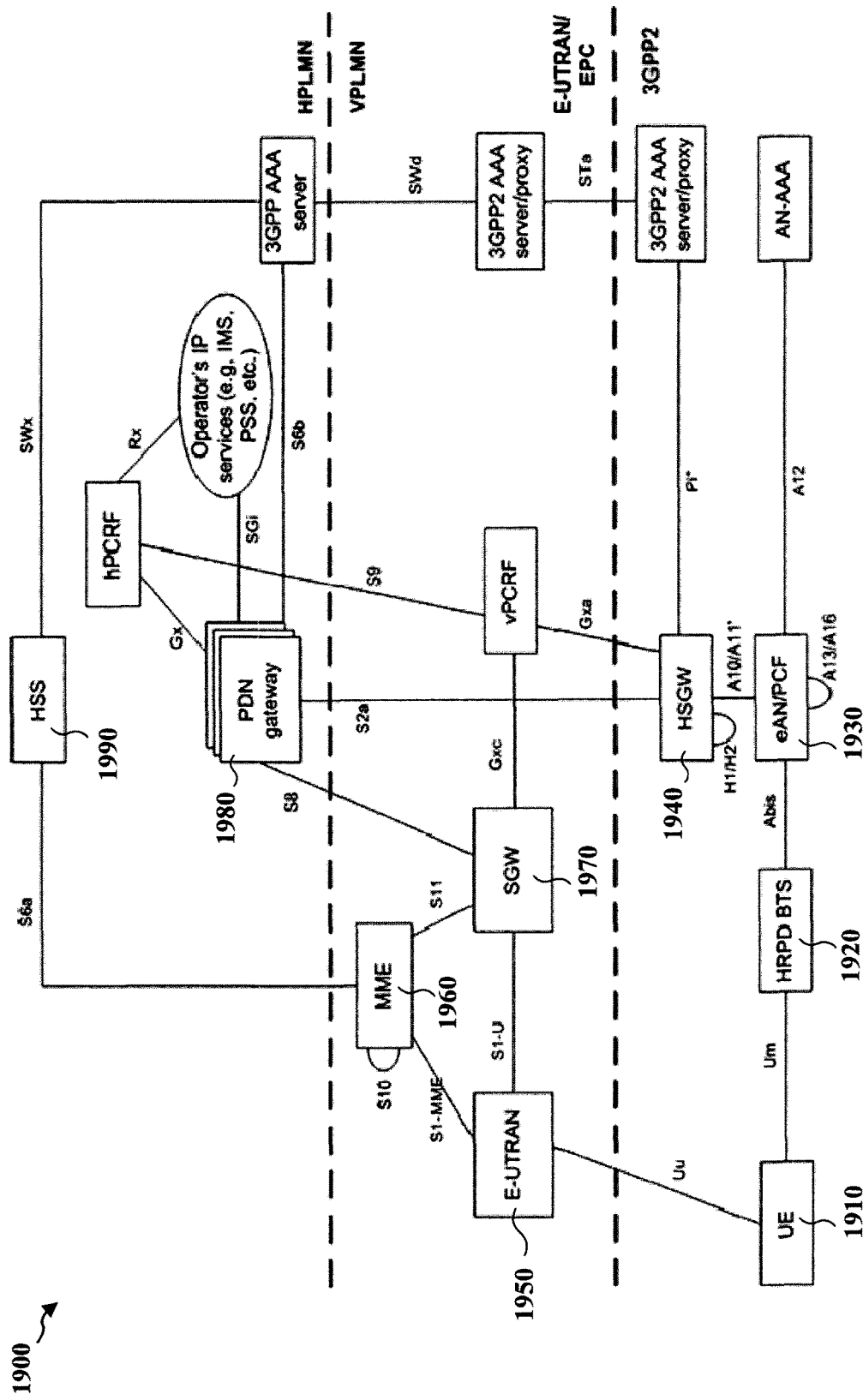
FIG. 19 is a diagram illustrating an interface between an evolved universal terrestrial radio access network (E-UTRAN)/evolved packet core (EPC) system and a 3GPP2 core network.

FIG. 19 is a diagram 1900 illustrating an example interface between an evolved universal terrestrial radio access network (E-UTRAN)/evolved packet core (EPC) system and a 3GPP2 core network. In one example, the UE 1910 may have radio access to a high rate packet data serving gateway (HSGW) 1940 and an enhanced high rate packet data access network (eAN)/packet control function (PCF) 1930 via a high rate packet data (HRPD) base transceiver station (BTS) 1920. The UE 1910 may also have radio access to an E-UTRAN 1950. As such, FIG. 19 illustrates how the UE 1910 accesses the EPC from an LTE radio access technology and an enhanced high rate packet data (eHRPD) radio access technology.

The EPC is a common core network for an LTE or eHRPD wireless communication system. The common core network serves as a common backbone infrastructure for a wireless communication system. The EPC may include any one of the following entities: mobility management entity (MME) 1960, serving gateway (SGW) 1970, packet data network (PDN) gateway 1980, home subscriber server (HSS) 1990, authentication authorization and accounting entity (AAA), access network discovery and selection function (ANDSF), evolved packet data gateway (ePDG), etc.

An LTE network may be shared by more than one high rate packet data (HRPD) network operator. The LTE network may advertise a parameter indicating a footprint of an HRPD network. The parameter may be referred to as a preregistration zone ID or HRPD color code, for example. When the UE moves from one HRPD subnet to another HRPD subnet, the UE may perform a session transfer operation for transferring a session from the one HRPD subnet to the other HRPD subnet. The UE may request the session transfer by sending a unicast access terminal identifier (UATI) assignment request message to the LTE network.

The UE monitors the LTE network, but may not monitor an HRPD network. Therefore, a mechanism is needed for indicating to the UE when to perform an HRPD session setup or session transfer operation even though the UE does not directly monitor the HRPD network. To setup a session transfer operation, the UE may establish a tunnel with the HRPD network through the LTE network and perform the session transfer operation. While the UE is in an idle mode, no tunnel is established and the UE does not monitor the HRPD network. The preregistration zone ID (or HRPD color code) may be transmitted as a broadcast message so that idle UEs may informed of when to initiate a session transfer operation as the UE moves from one HRPD footprint to another HRPD footprint.

The HRPD color code may be a 24 bit-value, which is a reduced value of an actual parameter indicating an HRPD subnet, i.e., a subnet ID. The subnet ID may be a 128-bit value. To save air interface resources, the 24-bit color code is transmitted by the LTE network instead of the 128-bit subnet ID to indicate an HRPD subnet.

The 24-bit color code may be unique to a particular location (e.g., area or region). Accordingly, when the UE moves from one area to another area, because the 24-bit value may be unique to an area, the UE may immediately detect whether an HRPD color code has changed, and hence detect whether an HRPD subnet has changed, and perform a session transfer operation to a new HRPD subnet having a new 128-bit subnet ID. The UE may correlate the new 24-bit value (new color code value) with the new 128-bit subnet ID.

Therefore, to quickly detect whether an HRPD subnet has changed, the UE assesses a newly received color code. If the received color code has changed from a previously received color code, the UE initiates a session transfer operation to obtain a new 128-bit subnet ID value. The UE may then associate the new 128-bit subnet ID value with the new color code received.

In an aspect, when two HRPD networks are overlaid on the same LTE network, two HRPD footprints exist. Accordingly, the LTE network should be able to indicate to the UE whether an HRPD color code transmission (HRPD preregistration zone ID transmission) is related to a first HRPD footprint or a second HRPD footprint. This prevents the UE connected to the first HRPD operator from potentially performing a false session transfer operation when the footprint of the second HRPD operator has changed.

Because the first and second HRPD operators are not coordinated, the HRPD color code (preregistration zone ID) of the first HRPD operator may be the same as the HRPD color code of the second HRPD operator. For example, a UE A is connected to HRPD operator A with subnet ID A matched to color code X. Moreover, a UE B is connected to HRPD operator B with subnet ID B, which is also matched to color code X. Thus, both color codes having the same value are transmitted (advertised) by the LTE network. When the color codes are received by the UE A connected to HRPD operator A, the UE A may realize at some point that the color code X changes to a color code Y. However, the UE A does not know for which HRPD operator (A or B) the color code change applies to. That is, the UE A does not know whether the subnet A or the subnet B has changed, and therefore may inappropriately perform a session transfer operation based on the color code change even if the subnet (HRPD subnet A) it is currently connected to has not changed.

The 24-bit HRPD color code value may be independently managed by an HRPD operator. Thus, different HRPD operators may choose to use the same value. The 24-bit value may be used in conjunction with a unique 128-bit HRPD subnet ID value. Accordingly, what is needed is a mechanism for distinguishing between a first HRPD operator and a second HRPD operator sharing the same LTE network when a transmitted HRPD color code (preregistration zone ID) of the first HRPD operator has the same value as a transmitted HRPD color code (preregistration zone ID) of the second HRPD operator.

In an aspect, a new format for the HRPD color code may be defined. Here, the LTE network may demand from HRPD operators that a color code of a respective HRPD operator have a unique identifier. The unique identifier allows the UE to distinguish one HRPD operator from other HRPD operators. The LTE operator may work with the HRPD operators to make sure that the color codes do not overlap or have the same value.

For example, when two HRPD operators sharing the same LTE network exist, one bit of the 24-bit color code may be reserved for uniquely identifying an HRPD operator. As such, the first HRPD operator may be identified by "0" and the second HRPD operator may be identified by "1" using the reserved bit. Additional bits may be reserved to accommodate the identification of more than two HRPD operators. Hence, a unique identifier may include X most significant bits embedded in the 24-bit color code, where X is an integer (e.g., 2). Alternatively, a standard format may be defined for uniquely identifying an HRPD operator using the 24-bit color code. For example, a portion of the 24-bit color code may be reserved for embedding a 12-bit mobile network code (MNC) identifying an HRPD operator.

The color code used by an HRPD session matches a preregistration zone ID. Hence, within an operator network, the operator specifies a new coding format for the color code. The new coding format may be used in both the eHRPD network and in the LTE network. By using the above-described mechanism, the color codes (preregistration zone IDs) for different HRPD operators transmitted by the LTE network are guaranteed to be different in a location (area or region).

In another aspect, the UE may receive color codes associated with different HRPD operators having the same value. In this case, the UE treats the color code information as incomplete information, since the color codes do not include a unique identifier for distinguishing between the different HRPD operators. Accordingly, when the UE receives a new color code different from the previously received color codes, the UE will assume that an HRPD subnet currently connected to the UE has changed. This will cause the UE to send a session transfer request (e.g., UATI assignment request message) to the LTE network for transferring a session to the HRPD subnet the UE believes is a new HRPD subnet. Accordingly, an enhanced high rate packet data access network (eAN) will respond to the UE with a session transfer response (e.g., UATI assignment response message) even if the HRPD color code (preregistration zone ID), and hence the HRPD subnet, has not changed.

In a further aspect, the parameter used by the LTE network for advertising a footprint of an HRPD network may include a subnet identifier. The subnet identifier may comprise, e.g., a PLMN ID for the HRPD network. This may enable a UE to perform a session transfer, e.g., when the received PLMN ID is different than the PLMN ID for the current HRPD subnet. The subnet identifier may also comprise a the subnet ID. As stated above, the subnet ID is 128-bit value indicating an HRPD subnet. The subnet ID is unique to the HRPD operator and may be used to avoid potential overlap between multiple HRPD operators, as may be the case when using an HRPD color code (preregistration zone ID). Hence, when the UE receives two or more HRPD subnet IDs from the LTE network, the UE is able to distinguish one HRPD operator from other HRPD operators. Accordingly, when the UE moves from one HRPD subnet to another HRPD subnet, the UE may easily determine to perform a session transfer operation for transferring a session from the one HRPD subnet to the other HRPD subnet based on the subnet identifier.

Figure 20:
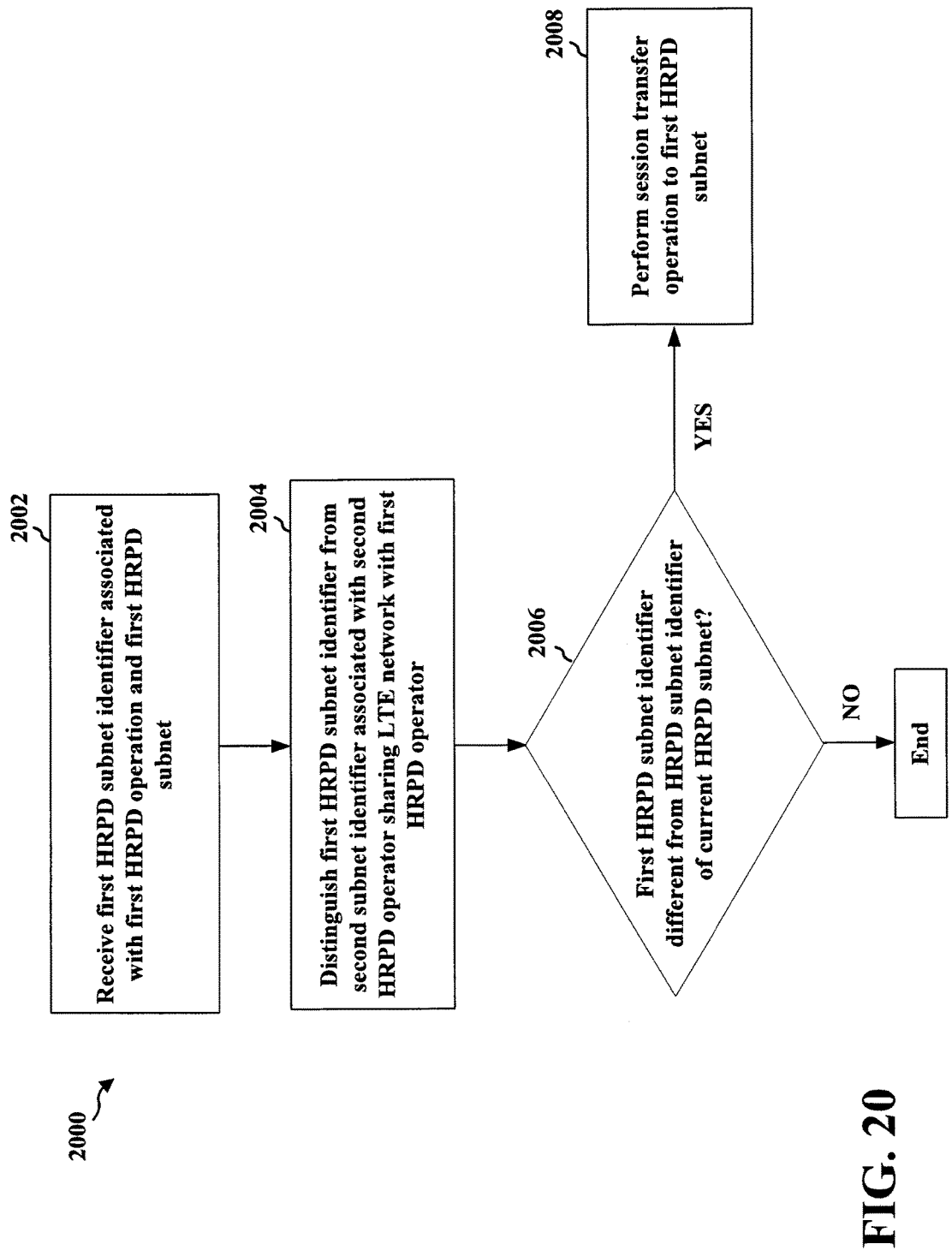
FIG. 20 is a flow chart of a method of wireless communication.

FIG. 20 is a flow chart 2000 of a method of wireless communication. The method may be performed by a UE. At step 2002, the UE receives a first high rate packet data (HRPD) subnet identifier associated with a first HRPD operator and a first HRPD subnet. At step 2004, the UE distinguishes the first HRPD subnet identifier from a second HRPD subnet identifier associated with a second HRPD operator sharing a long term evolution (LTE) network with the first HRPD operator.

At step 2006, the UE determines whether to perform a session transfer operation to the first HRPD subnet based on the distinguished first HRPD subnet identifier. In particular, the UE determines if the distinguished first HRPD subnet identifier is different from an HRPD subnet identifier associated with a current HRPD subnet. If so, at step 2008, the UE performs the session transfer operation to the first HRPD subnet. The subnet identifier may comprise, e.g., a PLMN ID. Therefore, the UE may perform a session transfer operation to the first HRPD subnet when the first HRPD subnet identifier is different from an HRPD subnet identifier associated with a current HRPD subnet, e.g., when the received PLMN ID is different than the PLMN ID for the current HRPD subnet.

Figure 21:
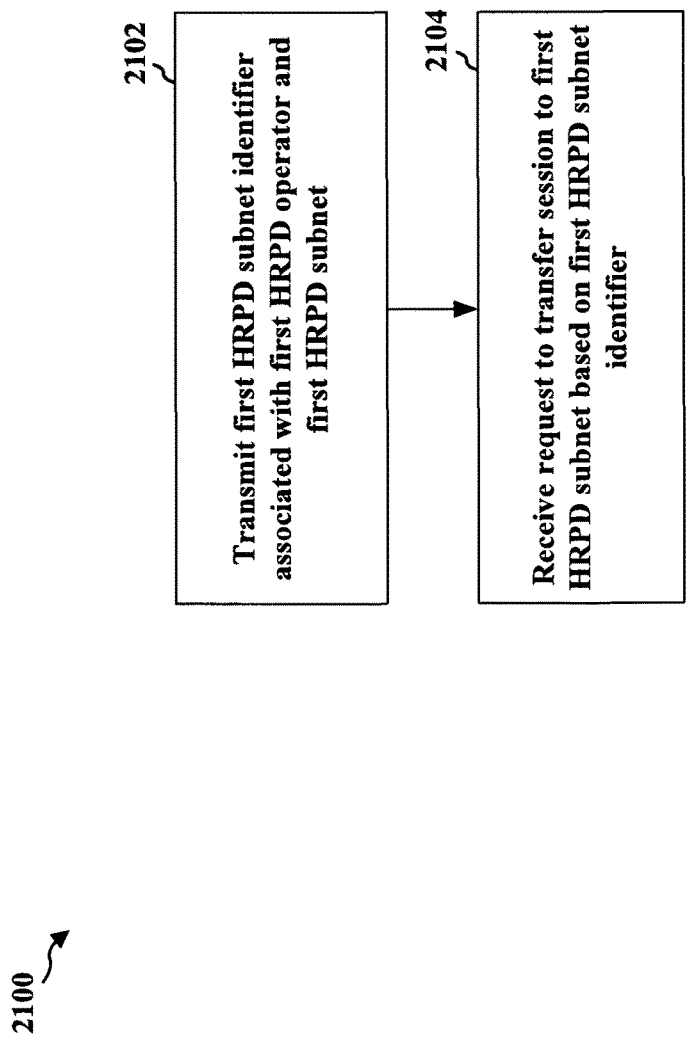
FIG. 21 is a flow chart of a method of wireless communication.

FIG. 21 is a flow chart 2100 of a method of wireless communication. The method may be performed by an eNB. At step 2102, the eNB transmits a first high rate packet data (HRPD) subnet identifier associated with a first HRPD operator and a first HRPD subnet. The first HRPD subnet identifier is distinguishable from a second HRPD subnet identifier associated with a second HRPD operator sharing a long term evolution (LTE) network with the first HRPD operator. At step 2104, the eNB receives, e.g., from a UE, at least one request to transfer a session to the first HRPD subnet based on the first HRPD subnet identifier, e.g., when the first HRPD subnet identifier is different from an HRPD subnet identifier associated with a current HRPD subnet. The subnet identifier may comprise, e.g., a PLMN ID. Therefore, the request may be received when the transmitted PLMN ID is different than the PLMN ID for the current HRPD subnet of the UE.

Figure 22:
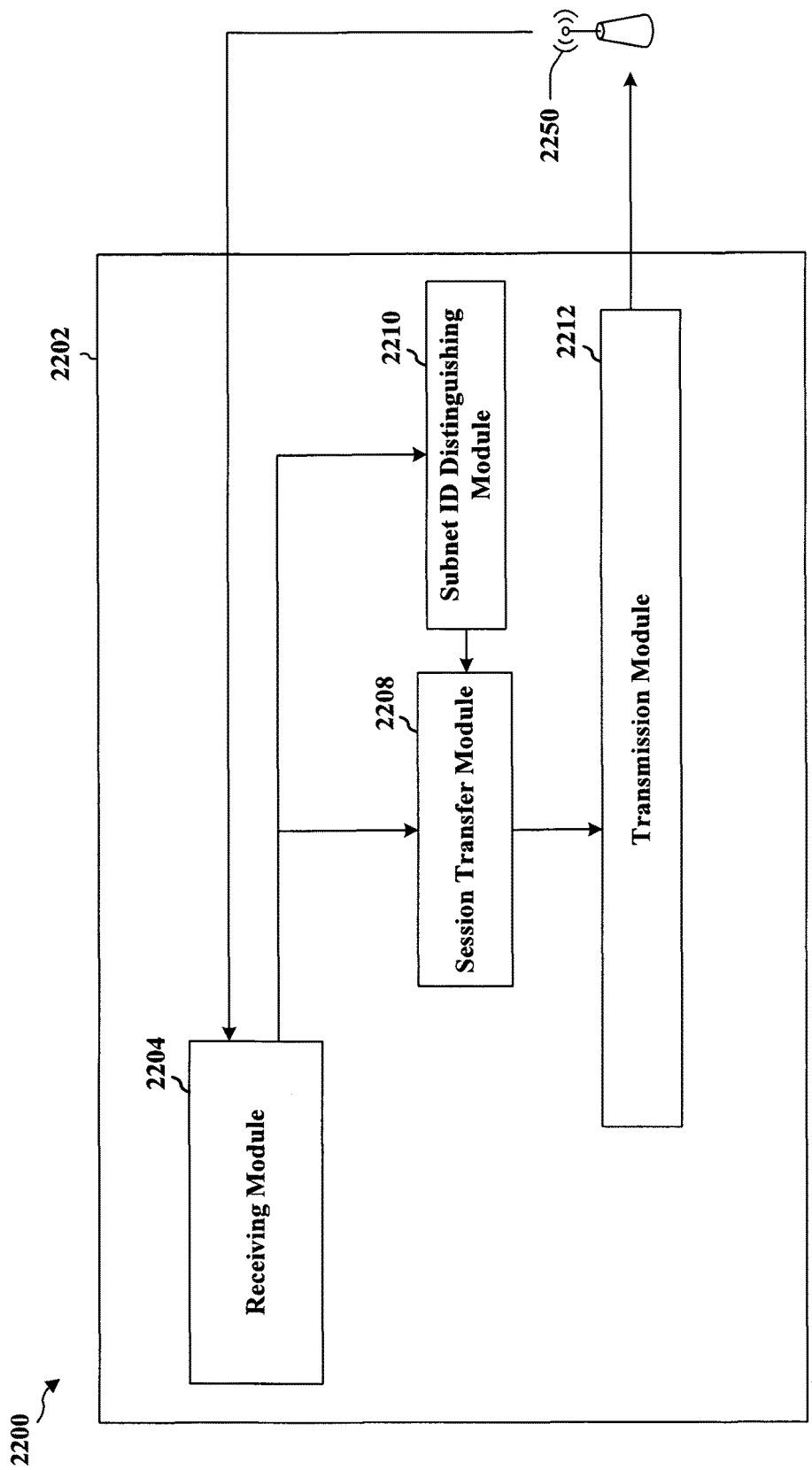
FIG. 22 is a conceptual data flow diagram illustrating the data flow between different modules/means/components in an exemplary apparatus.

FIG. 22 is a conceptual data flow diagram 2200 illustrating the data flow between different modules/means/components in an exemplary apparatus 2202. The apparatus may be a UE. The apparatus includes a receiving module 2204, a session transfer module 1108, a subnet ID distinguishing module 2210, and transmission module 2212.

In an aspect, the receiving module 2204 receives a first high rate packet data (HRPD) subnet identifier associated with a first HRPD operator and a first HRPD subnet. The subnet identifier may comprise, e.g., a PLMN ID associated with the first HRPD subnet. The subnet ID distinguishing module 2210 distinguishes the first HRPD subnet identifier from a second HRPD subnet identifier associated with a second HRPD operator sharing a long term evolution (LTE) network with the first HRPD operator. The session transfer module 2208 determines whether to perform a session transfer operation to the first HRPD subnet based on the distinguished first HRPD subnet identifier. In particular, the session transfer module 2208 determines if the distinguished first HRPD subnet identifier is different from an HRPD subnet identifier associated with a current HRPD subnet. If so, the session transfer module 2208 performs the session transfer operation to the first HRPD subnet via the transmission module 2212.

The apparatus may include additional modules that perform each of the steps of the algorithm in the aforementioned flow charts of FIG. 20. As such, each step in the aforementioned flow charts of FIG. 20 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 23:
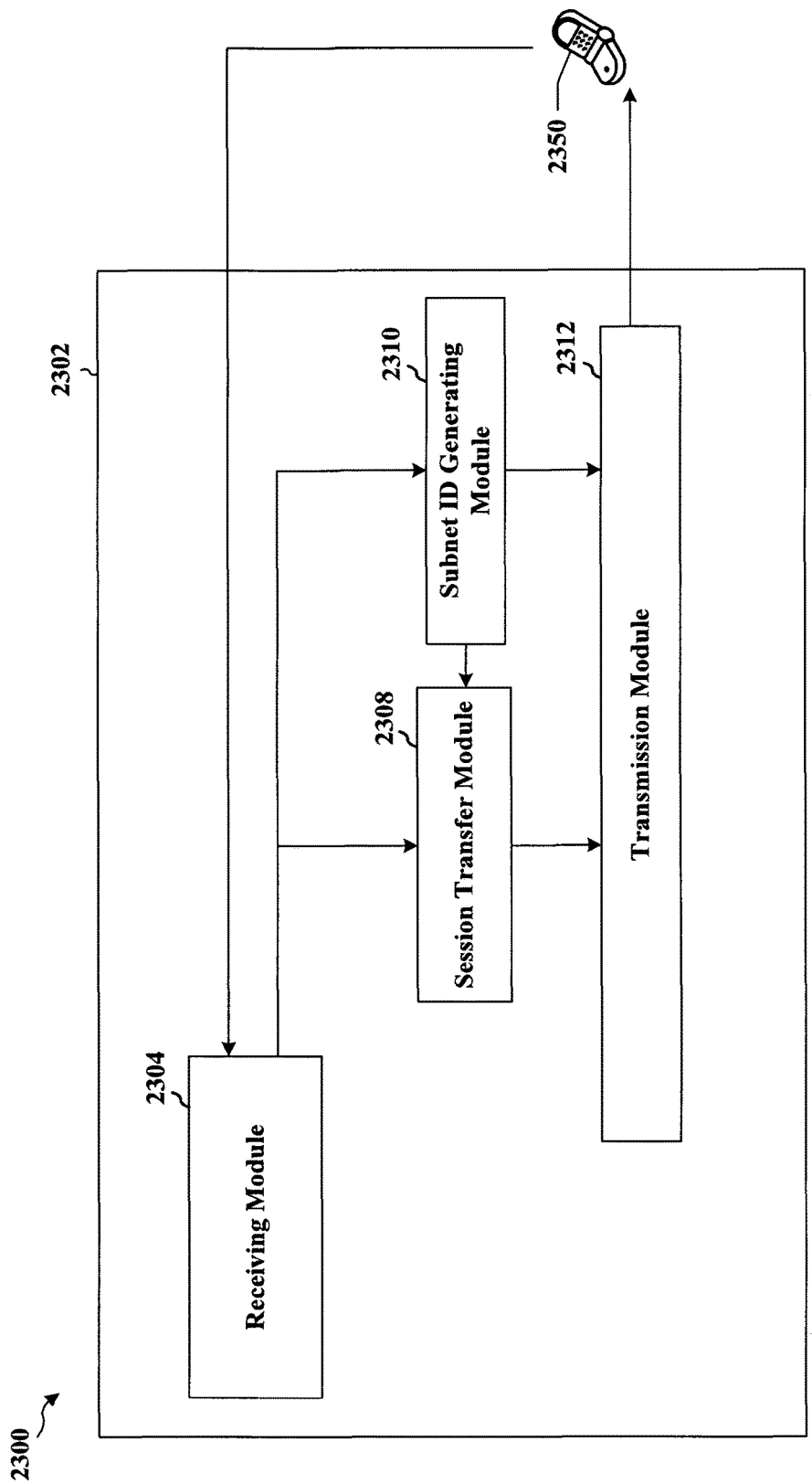
FIG. 23 is a conceptual data flow diagram illustrating the data flow between different modules/means/components in an exemplary apparatus.

FIG. 23 is a conceptual data flow diagram 2300 illustrating the data flow between different modules/means/components in an exemplary apparatus 2302. The apparatus may be an eNB. The apparatus includes a receiving module 2304, a session transfer module 2308, a subnet ID generating module 2310, and transmission module 2312.

In a aspect, the transmission module 2312 transmits a first high rate packet data (HRPD) subnet identifier associated with a first HRPD operator and a first HRPD subnet. The subnet identifier may comprise, e.g., a PLMN ID associated with the first subnet. The first HRPD subnet identifier may be generated by the subnet ID generating module 2310. The first HRPD subnet identifier is distinguishable from a second HRPD subnet identifier associated with a second HRPD operator sharing a long term evolution (LTE) network with the first HRPD operator. The session transfer module 2308 receives at least one request to transfer a session to the first HRPD subnet based on the first HRPD subnet identifier. The first HRPD subnet identifier may be different from an HRPD subnet identifier associated with a current HRPD subnet.

The apparatus may include additional modules that perform each of the steps of the algorithm in the aforementioned flow charts of FIG. 21. As such, each step in the aforementioned flow charts of FIG. 21 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 24:
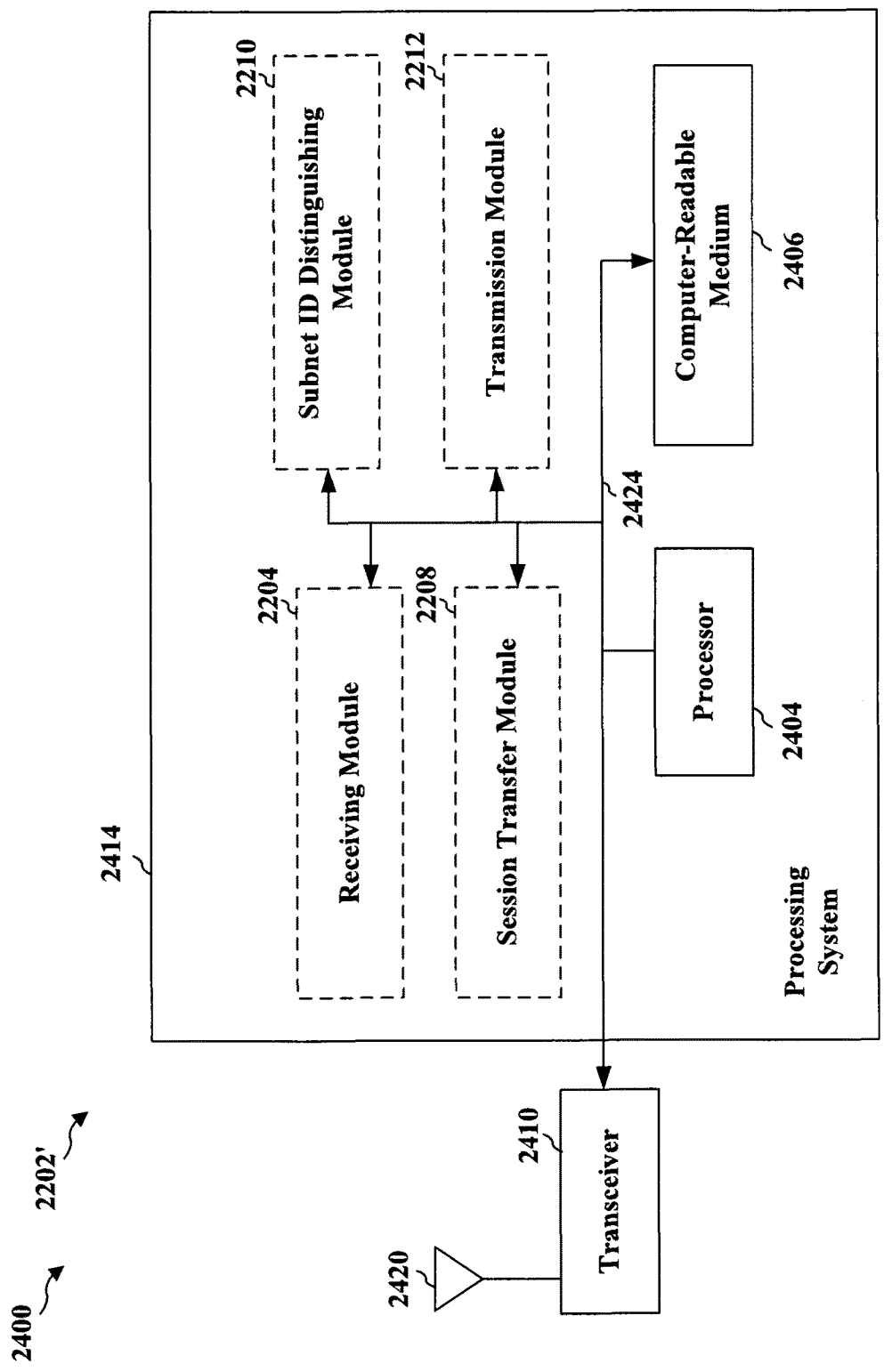
FIG. 24 is a diagram illustrating an example of a hardware implementation for an apparatus employing a processing system.

FIG. 24 is a diagram 2400 illustrating an example of a hardware implementation for an apparatus 2202' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware modules, represented by the processor 2404, the modules 2204, 2208, 2210, 2212 and the computer-readable medium 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The processing system 2414 includes a processor 2404 coupled to a computer-readable medium 2406. The processor 2404 is responsible for general processing, including the execution of software stored on the computer-readable medium 2406. The software, when executed by the processor 2404, causes the processing system 2414 to perform the various functions described supra for any particular apparatus. The computer-readable medium 2406 may also be used for storing data that is manipulated by the processor 2404 when executing software. The processing system further includes at least one of the modules 2204, 2208, 2210, and 2212. The modules may be software modules running in the processor 2404, resident/stored in the computer readable medium 2406, one or more hardware modules coupled to the processor 2404, or some combination thereof. The processing system 2414 may be a component of the UE 650 and may include the memory 660 and/or at least one of the TX processor 668, the RX processor 656, and the controller/processor 659.

In one configuration, the apparatus 2202/2202' for wireless communication includes means for receiving a first high rate packet data (HRPD) subnet identifier associated with a first HRPD operator and a first HRPD subnet; means for distinguishing the first HRPD subnet identifier from a second HRPD subnet identifier associated with a second HRPD operator sharing a long term evolution (LTE) network with the first HRPD operator; means for determining whether to perform a session transfer operation to the first HRPD subnet based on the distinguished first HRPD subnet identifier; and means for performing the session transfer operation to the first HRPD subnet when the first HRPD subnet identifier is different from an HRPD subnet identifier associated with a current HRPD subnet.

The aforementioned means may be one or more of the aforementioned modules of the apparatus 2202 and/or the processing system 2414 of the apparatus 2202' configured to perform the functions recited by the aforementioned means. As described supra, the processing system 2414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 25:
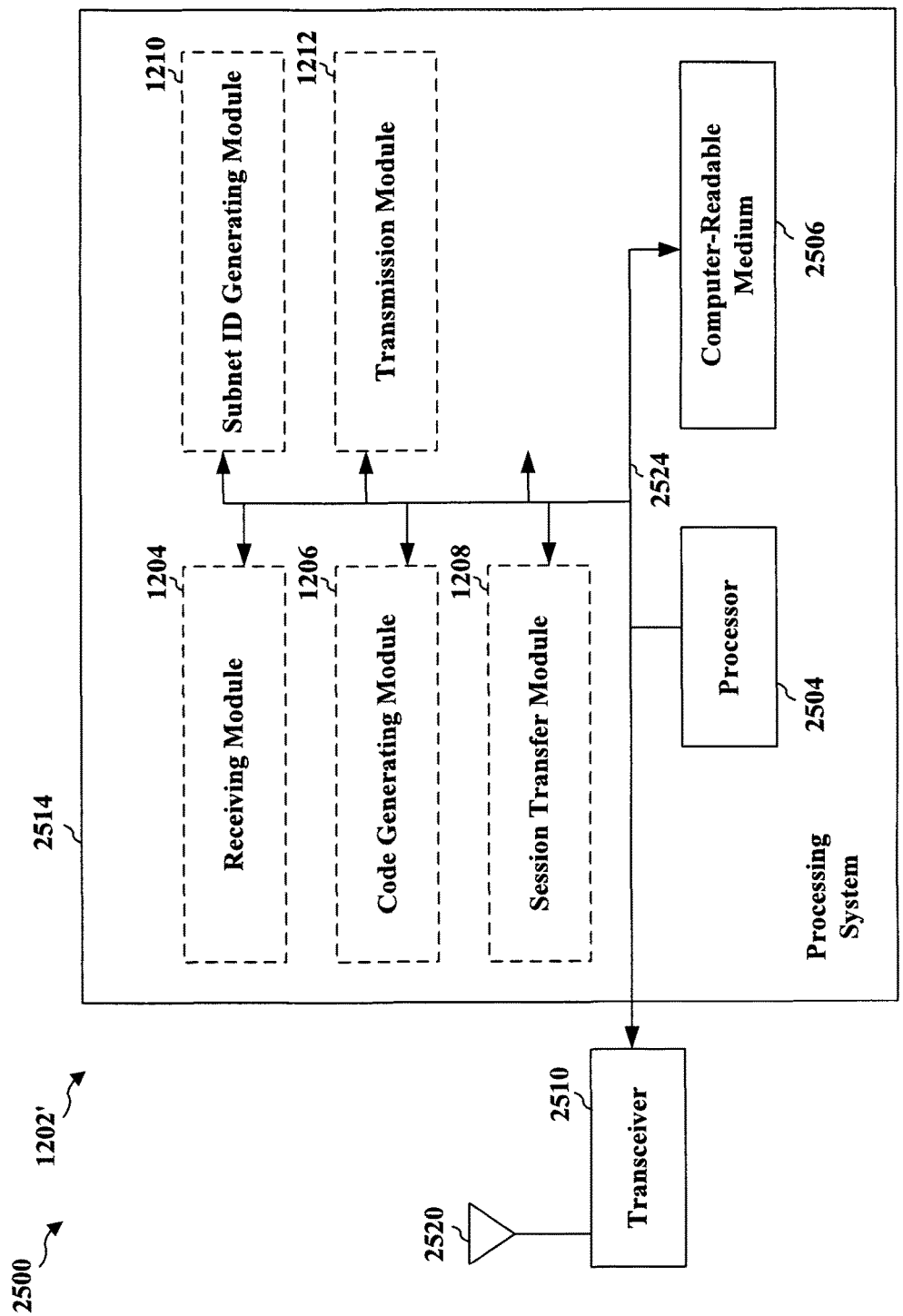
FIG. 25 is a diagram illustrating an example of a hardware implementation for an apparatus employing a processing system.

FIG. 25 is a diagram 2500 illustrating an example of a hardware implementation for an apparatus 2302' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware modules, represented by the processor 2504, the modules 2304, 2308, 2310, 2312 and the computer-readable medium 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The processing system 2514 includes a processor 2504 coupled to a computer-readable medium 2506. The processor 2504 is responsible for general processing, including the execution of software stored on the computer-readable medium 2506. The software, when executed by the processor 2504, causes the processing system 2514 to perform the various functions described supra for any particular apparatus. The computer-readable medium 2506 may also be used for storing data that is manipulated by the processor 2504 when executing software. The processing system further includes at least one of the modules 2304, 2308, 2310, and 2312. The modules may be software modules running in the processor 2504, resident/stored in the computer readable medium 2506, one or more hardware modules coupled to the processor 2504, or some combination thereof. The processing system 2514 may be a component of eNB 610 or MME 706 and may include the memory 676 and/or at least one of the TX processor 616, the RX processor 670, and the controller/processor 675.

In one configuration, the apparatus 2302/2302' for wireless communication includes means for transmitting a first high rate packet data (HRPD) subnet identifier associated with a first HRPD operator and a first HRPD subnet, the first HRPD subnet identifier distinguishable from a second HRPD subnet identifier associated with a second HRPD operator sharing a long term evolution (LTE) network with the first HRPD operator; and means for receiving at least one request to transfer a session to the first HRPD subnet based on the first HRPD subnet identifier.

The aforementioned means may be one or more of the aforementioned modules of the apparatus 2302 and/or the processing system 2514 of the apparatus 2302' configured to perform the functions recited by the aforementioned means. As described supra, the processing system 2514 may include the TX Processor 316, the RX Processor 370, and the controller/processor 375. As such, in one configuration, the aforementioned means may be the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving network information for a plurality of CDMA2000 networks, while connected to a long term evolution radio access network (LTE RAN), wherein the network information is received in a system information block (SIB) and wherein the network information relates to a default network;
identifying a CDMA2000 network for circuit-switched fallback (CSFB); and
performing a CSFB procedure on the identified CDMA2000 network.

2. The method of claim 1, further comprising receiving CDMA2000 parameters associated with the plurality of identified CDMA2000 networks from a base station.

3. The method of claim 1, wherein identifying a CDMA2000 network includes receiving a network identifier corresponding to a CDMA2000 network selected by a network entity.

4. A method of wireless communication, comprising:
receiving network information for a plurality of CDMA2000 networks, while connected to a long term evolution radio access network (LTE RAN), wherein the network information is received in a system information block (SIB) and wherein the network information comprises a plurality of public land mobile network (PLMN) identifiers (IDs), each PLMN ID associated with a CDMA2000 network sharing the LTE RAN;
identifying a CDMA2000 network for circuit-switched fallback (CSFB); and
performing a CSFB procedure on the identified CDMA2000 network.

5. The method of claim 4, further comprising maintaining a mapping of the plurality of PLMN IDs that maps each PLMN ID to one or more of a system ID (SID) and a network ID (NID) corresponding to a CDMA2000 network.

6. The method of claim 4, wherein selecting the CDMA2000 network for CSFB includes selecting one of the plurality of PLMN IDs.

7. The method of claim 6, wherein performing the CSFB procedure comprises sending a radio resource control (RRC) connection request, the RRC message including the selected PLMN ID.

8. The method of claim 7, wherein performing the CSFB procedure further comprises sending an RRC connection setup complete message that includes the selected PLMN ID.

9. The method of claim 8, wherein performing the CSFB procedure comprises requesting network parameters for the CDMA2000 network selected for CSFB subsequent to sending the RRC connection setup complete message.

10. A method of wireless communication, comprising:
receiving network information for a plurality of CDMA2000 networks, while connected to a long term evolution radio access network (LTE RAN), wherein the network information is received in a system information block (SIB);
identifying a CDMA2000 network for circuit-switched fallback (CSFB); and performing a CSFB procedure on the identified CDMA2000 network, wherein performing the CSFB procedure comprises sending a plurality of CSFB-related uplink messages, each of the CSFB-related uplink messages including information identifying the identified CDMA2000 network.

11. An apparatus for wireless communication, comprising:
receiver means for receiving network information for a plurality of CDMA2000 networks, while connected to a long term evolution radio access network (LTE RAN), wherein the network information is received in a system information block (SIB), wherein the network information relates to a default network;
selector means for selecting a CDMA2000 network for circuit-switched fallback (CSFB); and
CFSB means for performing a CSFB procedure on the selected CDMA2000 network.

12. The apparatus of claim 11, wherein the receiver means for receiving receives CDMA2000 parameters associated with the identified CDMA2000 network from a base station.

13. The apparatus of claim 11, wherein the selector means for selecting identifies the selected CDMA2000 network based on a network identifier received from a base station and corresponding to a CDMA2000 network selected by a network entity.

14. An apparatus for wireless communication, comprising:
receiver means for receiving network information for a plurality of CDMA2000 networks, while connected to a long term evolution radio access network (LTE RAN), wherein the network information is received in a system information block (SIB) and wherein the network information comprises a plurality of public land mobile network (PLMN) identifiers (IDs), each PLMN ID associated with a CDMA2000 network sharing the LTE RAN;
selector means for selecting a CDMA2000 network for circuit-switched fallback (CSFB); and
CFSB means for performing a CSFB procedure on the selected CDMA2000 network.

15. The apparatus of claim 14, further comprising information maintenance means for maintaining a mapping of the plurality of PLMN IDs that maps each PLMN ID to one or more of a system ID (SID) and a network ID (NID) corresponding to a CDMA2000 network.

16. The apparatus of claim 14, wherein the selector means for selecting the CDMA2000 network for CSFB selects one of the plurality of PLMN IDs.

17. The apparatus of claim 16, wherein the CFSB means for performing the CSFB procedure sends a radio resource control (RRC) connection request, the RRC message including the selected PLMN ID.

18. The apparatus of claim 17, wherein the CFSB means for performing the CSFB procedure further sends an RRC connection setup complete message that includes the selected PLMN ID.

19. The apparatus of claim 18, wherein the CFSB means for performing the CSFB procedure requests network parameters for the CDMA2000 network selected for CSFB subsequent to sending the RRC connection setup complete message.

20. An apparatus for wireless communication, comprising:
receiver means for receiving network information for a plurality of CDMA2000 networks, while connected to a long term evolution radio access network (LTE RAN), wherein the network information is received in a system information block (SIB);
selector means for selecting a CDMA2000 network for circuit-switched fallback (CSFB); and
CFSB means for performing a CSFB procedure on the selected CDMA2000 network,
wherein the CFSB means for performing the CSFB procedure sends a plurality of CSFB-related uplink messages, each of the CSFB-related uplink messages including information identifying the selected CDMA2000 network.

21. An apparatus for wireless communication, comprising:
a memory; and
at least one processor coupled to the memory and configured to:
receive network information for a plurality of CDMA2000 networks, while connected to a long term evolution radio access network (LTE RAN), wherein the network information is received in a system information block (SIB) and wherein the network information relates to a default network;
identify a CDMA2000 network for circuit-switched fallback (CSFB); and
perform a CSFB procedure on the identified CDMA2000 network.

22. The apparatus of claim 21, wherein the at least one processor is further configured to:
receive CDMA2000 parameters associated with the plurality of identified CDMA2000 networks from a base station.

23. The apparatus of claim 21, wherein identifying a CDMA2000 network includes receiving a network identifier corresponding to a CDMA2000 network selected by a network entity.

24. A non-transitory computer-readable medium storing computer executable code to:
receive network information for a plurality of CDMA2000 networks, while connected to a long term evolution radio access network (LTE RAN), wherein the network information is received in a system information block (SIB) and wherein the network information relates to a default network;
select a CDMA2000 network for circuit-switched fallback (CSFB); and
perform a CSFB procedure on the selected CDMA2000 network.

25. The non-transitory computer-readable medium of claim 24, further comprising code to:
receive CDMA2000 parameters associated with the plurality of identified CDMA2000 networks from a base station.

26. The non-transitory computer-readable medium of claim 24, wherein identifying a CDMA2000 network includes receiving a network identifier corresponding to a CDMA2000 network selected by a network entity.

27. A method of wireless communication, comprising:
determining a plurality of public land mobile network (PLMN) identifiers (IDs) in a network that includes a long term evolution radio access network (LTE RAN), each PLMN ID associated with a CDMA2000 network sharing the LTE RAN;
selecting a CDMA2000 network for circuit-switched fallback (CSFB) of a user equipment (UE) operating in the LTE RAN; and providing configuration information to the UE, wherein the configuration information configures the UE to perform a CSFB procedure on the selected CDMA2000 network.

28. The method of claim 27, wherein the CDMA2000 network is selected by a mobility management entity (MME) responsive to a PLMN selection procedure.

29. The method of claim 28, wherein the PLMN selection procedure is performed when the UE reports multiple-operator capability.

30. The method of claim 29, further comprising maintaining network information associated with the selected CDMA2000 network at the MME.

31. The method of claim 30, wherein the information comprises a measurement configuration based on the selected CDMA2000 network.

32. The method of claim 30, wherein the CDMA2000 network is selected for CSFB based on the network information associated with the selected CDMA2000 network.

33. The method of claim 30, wherein the CDMA2000 network is selected for CSFB based on one or more of an indication of a PLMN ID provided by the UE, a tracking area corresponding to the UE, a visiting network policy and a home operator policy associated with the UE.

34. The method of claim 33, wherein the home operator policy is maintained by the MME.

35. The method of claim 30, wherein the network information associated with the selected CDMA2000 network is provided by the MME to the UE in an information element (IE).

36. The method of claim 30, wherein the network information associated with the selected CDMA2000 network is provided to the UE in CDMA2000 parameters.

37. The method of claim 29, wherein providing configuration information to the UE comprises broadcasting the network information associated with the selected CDMA2000 network in a system information block.

38. The method of claim 27, wherein providing configuration information to the UE comprises broadcasting one or more of the plurality of PLMN IDs in a system information block.

39. The method of claim 27, further comprising maintaining a mapping of PLMN IDs that associates each of the plurality of PLMN IDs to one or more of a system ID (SID) and a network ID (NID) corresponding to a CDMA2000 network.

40. The method of claim 39, further comprising synchronizing the mapping of the PLMN IDs with a corresponding mapping of PLMN IDs maintained by the UE.

41. An apparatus for wireless communication, comprising:
determination means for determining a plurality of public land mobile network (PLMN) identifiers (IDs) in a network that includes a long term evolution radio access network (LTE RAN), each PLMN ID associated with a CDMA2000 network sharing the LTE RAN;
selector means for selecting a CDMA2000 network for circuit-switched fallback (CSFB) of a user equipment (UE) operating in the LTE RAN; and
transmission means for sending configuration information to the UE, wherein the configuration information configures the UE to perform a CSFB procedure on the selected CDMA2000 network.

42. The apparatus of claim 41, wherein the CDMA2000 network is selected by a mobility management entity (MME) responsive to a PLMN selection procedure.

43. The apparatus of claim 42, wherein the PLMN selection procedure is performed when the UE reports multiple-operator capability.

44. The apparatus of claim 43, further comprising information maintenance means for maintaining network information associated with the selected CDMA2000 network at the MME.

45. The apparatus of claim 44, wherein the information comprises a measurement configuration based on the selected CDMA2000 network.

46. The apparatus of claim 44, wherein the CDMA2000 network is selected for CSFB based on the network information associated with the selected CDMA2000 network.

47. The apparatus of claim 44, wherein the CDMA2000 network is selected for CSFB based on one or more of an indication of a PLMN ID provided by the UE, a tracking area corresponding to the UE, a visiting network policy and a home operator policy associated with the UE.

48. The apparatus of claim 47, wherein the home operator policy is maintained by the MME.

49. The apparatus of claim 44, wherein the network information associated with the selected CDMA2000 network is provided by the MME to the UE in an information element (IE).

50. The apparatus of claim 44, wherein the network information associated with the selected CDMA2000 network is provided to the UE in CDMA2000 parameters.

51. The apparatus of claim 43, wherein the transmission means for sending configuration information broadcasts the network information associated with the selected CDMA2000 network in a system information block.

52. The apparatus of claim 41, wherein the transmission means for sending configuration information broadcasts one or more of the plurality of PLMN IDs in a system information block.

53. The apparatus of claim 41, further comprising information maintenance means for maintaining a mapping of PLMN IDs that associates each of the plurality of PLMN IDs to one or more of a system ID (SID) and a network ID (NID) corresponding to a CDMA2000 network.

54. The apparatus of claim 53, wherein the information maintenance means for maintaining the mapping synchronizes the mapping of the PLMN IDs with a corresponding mapping of PLMN IDs maintained by the UE.

55. An apparatus for wireless communication, comprising:
a memory; and
at least one processor coupled to the memory and configured to:
determine a plurality of public land mobile network (PLMN) identifiers (IDs) in a network that includes a long term evolution radio access network (LTE RAN), each PLMN ID associated with a CDMA2000 network sharing the LTE RAN;
select a CDMA2000 network for circuit-switched fallback (CSFB) of a user equipment (UE) operating in the LTE RAN; and
provide configuration information to the UE, wherein the configuration information configures the UE to perform a CSFB procedure on the selected CDMA2000 network.

56. The apparatus of claim 55, wherein the CDMA2000 network is selected by a mobility management entity (MME) responsive to a PLMN selection procedure.

57. The apparatus of claim 55, wherein providing configuration information to the UE comprises broadcasting one or more of the plurality of PLMN IDs in a system information block.

58. The apparatus of claim 55, wherein the at least one processor is further configured to:
maintain a mapping of PLMN IDs that associates each of the plurality of PLMN IDs to one or more of a system ID (SID) and a network ID (NID) corresponding to a CDMA2000 network.

59. A non-transitory computer-readable medium storing computer executable code to:
determine a plurality of public land mobile network (PLMN) identifiers (IDs) in a network that includes a long term evolution radio access network (LTE RAN), each PLMN ID associated with a CDMA2000 network sharing the LTE RAN;
select a CDMA2000 network for circuit-switched fallback (CSFB) of a user equipment (UE) operating in the LTE RAN; and
send configuration information to the UE, wherein the configuration information configures the UE to perform a CSFB procedure on the selected CDMA2000 network.

60. The non-transitory computer-readable medium of claim 59, wherein providing configuration information to the UE comprises broadcasting one or more of the plurality of PLMN IDs in a system information block.

61. The non-transitory computer-readable medium of claim 59, further comprising code to:
maintain a mapping of PLMN IDs that associates each of the plurality of PLMN IDs to one or more of a system ID (SID) and a network ID (NID) corresponding to a CDMA2000 network.

62. The non-transitory computer-readable medium of claim 59, wherein the CDMA2000 network is selected by a mobility management entity (MME) responsive to a PLMN selection procedure.

63. An apparatus for wireless communication, comprising:
a memory; and
at least one processor coupled to the memory and configured to:
receive network information for a plurality of CDMA2000 networks, while connected to a long term evolution radio access network (LTE RAN), wherein the network information is received in a system information block (SIB) and wherein the network information comprises a plurality of public land mobile network (PLMN) identifiers (IDs), each PLMN ID associated with a CDMA2000 network sharing the LTE RAN;
identify a CDMA2000 network for circuit-switched fallback (CSFB); and
perform a CSFB procedure on the identified CDMA2000 network.

64. The apparatus of claim 63, wherein the at least one processor is further configured to:
maintain a mapping of the plurality of PLMN IDs that maps each PLMN ID to one or more of a system ID (SID) and a network ID (NID) corresponding to a CDMA2000 network.

65. The apparatus of claim 63, wherein selecting the CDMA2000 network for CSFB includes selecting one of the plurality of PLMN IDs.

66. The apparatus of claim 65, wherein performing the CSFB procedure comprises sending a radio resource control (RRC) connection request, the RRC message including the selected PLMN ID.

67. The apparatus of claim 66, wherein performing the CSFB procedure further comprises sending an RRC connection setup complete message that includes the selected PLMN ID.

68. The apparatus of claim 67, wherein performing the CSFB procedure comprises requesting network parameters for the CDMA2000 network selected for CSFB subsequent to sending the RRC connection setup complete message.

69. An apparatus for wireless communication, comprising:
a memory; and
at least one processor coupled to the memory and configured to:
receive network information for a plurality of CDMA2000 networks, while connected to a long term evolution radio access network (LTE RAN), wherein the network information is received in a system information block (SIB) ;
identify a CDMA2000 network for circuit-switched fallback (CSFB); and
perform a CSFB procedure on the identified CDMA2000 network, wherein performing the CSFB procedure comprises sending a plurality of CSFB-related uplink messages, each of the CSFB-related uplink messages including information identifying the identified CDMA2000 network.

70. A non-transitory computer-readable medium storing computer executable code to:
receive network information for a plurality of CDMA2000 networks, while connected to a long term evolution radio access network (LTE RAN), wherein the network information is received in a system information block (SIB) and wherein the network information comprises a plurality of public land mobile network (PLMN) identifiers (IDs), each PLMN ID associated with a CDMA2000 network sharing the LTE RAN;
select a CDMA2000 network for circuit-switched fallback (CSFB); and
perform a CSFB procedure on the selected CDMA2000 network.

71. The non-transitory computer-readable medium of claim 70, further comprising code to:
maintain a mapping of the plurality of PLMN IDs that maps each PLMN ID to one or more of a system ID (SID) and a network ID (NID) corresponding to a CDMA2000 network.

72. The non-transitory computer-readable medium of claim 70, wherein selecting the CDMA2000 network for CSFB includes selecting one of the plurality of PLMN IDs.

73. The non-transitory computer-readable medium of claim 72, wherein performing the CSFB procedure comprises sending a radio resource control (RRC) connection request, the RRC message including the selected PLMN ID.

74. The non-transitory computer-readable medium of claim 73, wherein performing the CSFB procedure further comprises sending an RRC connection setup complete message that includes the selected PLMN ID.

75. The non-transitory computer-readable medium of claim 74, wherein performing the CSFB procedure comprises requesting network parameters for the CDMA2000 network selected for CSFB subsequent to sending the RRC connection setup complete message.

76. A non-transitory computer-readable medium storing computer executable code to:
- receive network information for a plurality of CDMA2000 networks, while connected to a long term evolution radio access network (LTE RAN), wherein the network information is received in a system information block (SIB);
- select a CDMA2000 network for circuit-switched fallback (CSFB); and
- perform a CSFB procedure on the selected CDMA2000 network, wherein performing the CSFB procedure comprises sending a plurality of CSFB-related uplink messages, each of the CSFB-related uplink messages including information identifying the selected CDMA2000 network.

* * * * *